United States Patent [19]

Oshio et al.

[11] Patent Number: 6,096,243
[45] Date of Patent: Aug. 1, 2000

[54] METHOD FOR PRODUCING A DIVALENT EUROPIUM-ACTIVATED PHOSPHOR

[75] Inventors: Shouzo Oshio, Nara; Teruaki Shigeta; Tomizo Matsuoka, both of Neyagawa; Toru Higashi, Takatsuki, all of Japan

[73] Assignee: Matsushita Electric Industrial Co., Ltd., Osaka, Japan

[21] Appl. No.: 09/185,337

[22] Filed: Nov. 3, 1998

[30] Foreign Application Priority Data

Nov. 6, 1997 [JP] Japan .................................. 9-322494

[51] Int. Cl.$^7$ .................................................. C09K 11/64
[52] U.S. Cl. .................................................. 252/301.4 R
[58] Field of Search .................................. 252/301.4 R

[56] References Cited

U.S. PATENT DOCUMENTS 4,161,457 7/1979 Takahashi et al. ............... 252/301.4 R
4,894,584 1/1990 Steinmann et al. ..................... 313/557

FOREIGN PATENT DOCUMENTS 0 766 285  4/1997  European Pat. Off. .
52-144385  12/1977  Japan .
53-31835   9/1978   Japan .
4-270782   9/1992   Japan .
997600     7/1965   United Kingdom .

OTHER PUBLICATIONS

A.L.N. Stevels et al. "Eu$^{2+}$ Luminescence in Hexagonal Aluminates Containing Large Divalent or Trivalent Cations" *J. Electrochem. Soc.*, vol. 123, No. 5, pp. 691–697, May 1976.

Primary Examiner—C. Melissa Koslow
Attorney, Agent, or Firm—Merchant & Gould P.C.

[57] ABSTRACT

A phosphor host compound is produced from a host compound material. Then, the host compound and a trivalent europium compound are reacted in a reducing atmosphere to generate a desired divalent europium-activated phosphor. If the divalent europium-activated phosphor is generated in this manner, a chemical reaction between the raw material for the host compound and the trivalent europium compound can be suppressed. Therefore, variations in the luminescent color among different production lots of the phosphor can be suppressed, and a phosphor with high color purity can be provided with high repeatability.

90 Claims, 16 Drawing Sheets

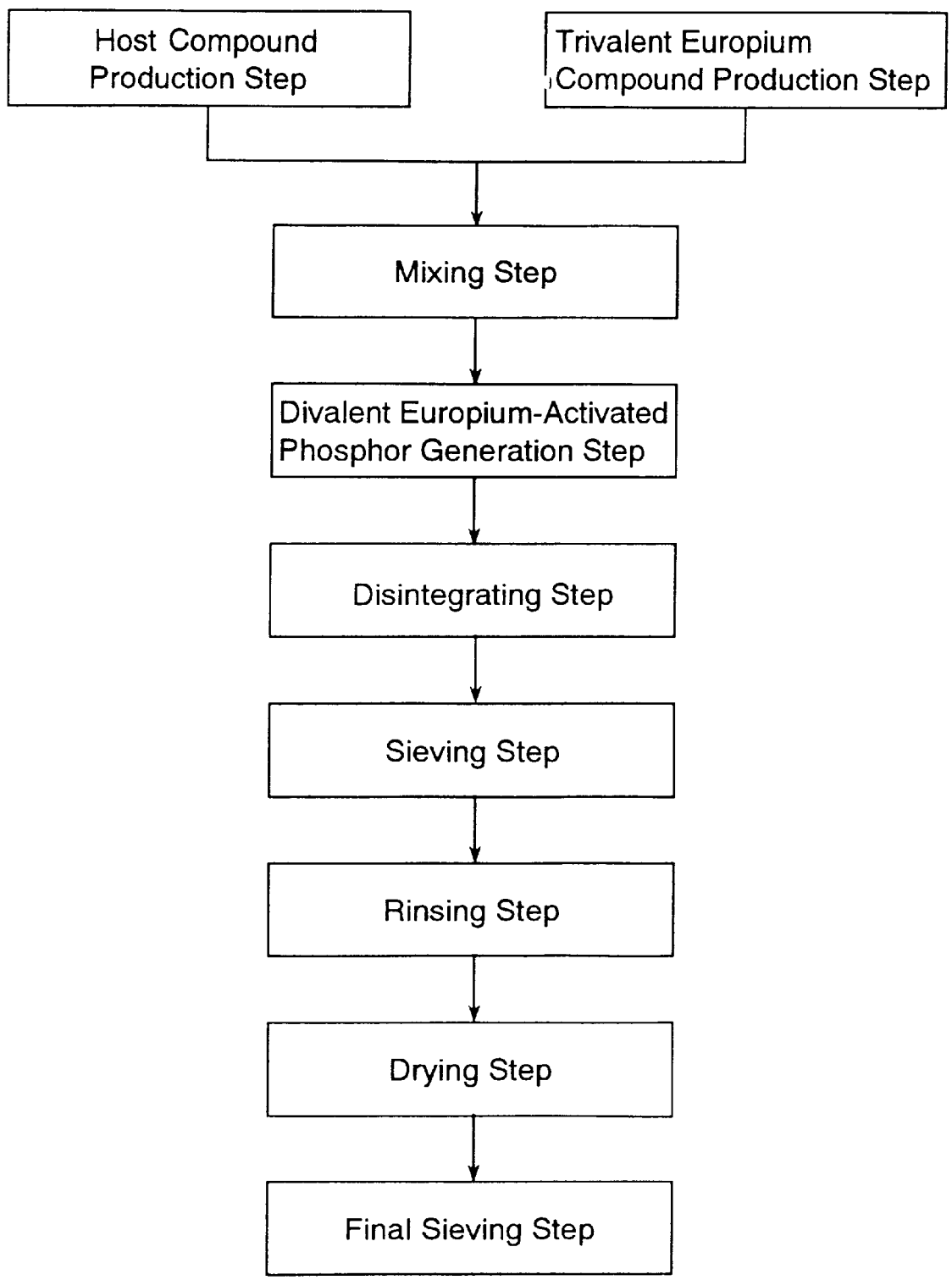
F I G. 1

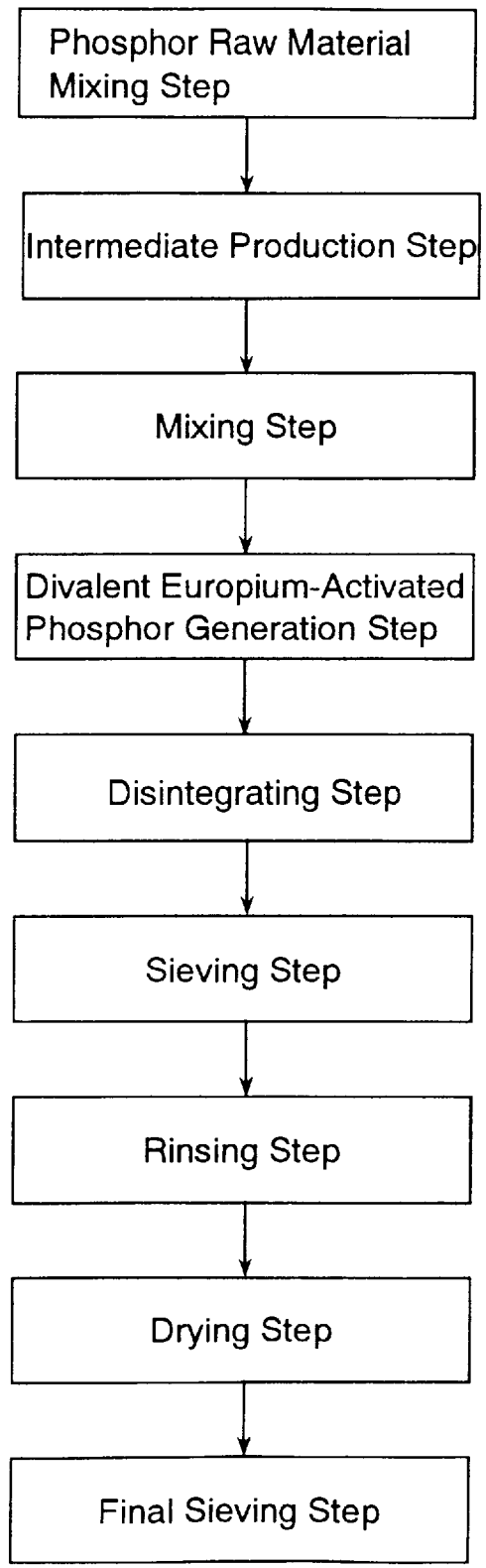
F I G. 2

METHOD FOR PRODUCING A DIVALENT EUROPIUM-ACTIVATED PHOSPHOR

FIELD OF THE INVENTION

The present invention relates to a method for producing a divalent europium-activated phosphor suitable for luminescent devices, such as fluorescent lamps or plasma display panels (PDPs).

BACKGROUND OF THE INVENTION

Conventionally, divalent europium-activated phosphors with $Eu^{2+}$ luminescent centers, such as $BaMgAl_{10}O_{17}:Eu^{2+}$ or $(Ba, Sr)MgAl_{10}O_{17}:Eu^{2+}, Mn^{2+}$, are used for blue phosphors in luminescent devices.

Divalent europium-activated phosphors show emission spectra with a broad half-width that is due to the electron transition from the excitation level $4f^65d$ to the ground level $4f^7$ characteristic to the $Eu^{2+}$ ion. Moreover, in such phosphors, the ground level $4f^65d$ is susceptible to the influence of the crystal field, so that, depending on the phosphor host, colors from ultra-violet spanning the entire visible range can be emitted.

Conventionally, divalent europium-activated phosphors are produced by reacting a mixture of the raw material for the phosphor, which has been mixed in a mixer such as a ball mill, in a reducing atmosphere (for example a gaseous atmosphere of nitrogen mixed with hydrogen). This process is described in more detail in "Keikoutai Handobukku" (The Phosphor Handbook) pp. 207–240, published by Ohmsha Ltd.

Chemical compounds comprising divalent europium ions are chemically unstable at regular temperatures and pressures in air. A compound comprising a trivalent europium such as $Eu_2O_3$ can be used as the raw material for the europium of divalent europium-activated phosphors.

As a raw material for the divalent europium-activated aluminate phosphor with the above-mentioned structural formula, alkaline-earth carbonates (barium carbonate, strontium carbonate, basic magnesium carbonate, etc.) aluminum oxide, europium oxide, or manganese carbonate, mixed with a suitable amount of flux, can be used. Conventionally, divalent europium-activated aluminate phosphors are produced by (a) pre-firing this raw material for the phosphor in air at less than 1500° C. as necessary, and then (b) firing it at 1200° C.–1800° C. for several hours in a reducing atmosphere (see for example the above-cited phosphor handbook, Publication of Examined Japanese Patent Application No. Hei7-77126, or J. Electrochem. Soc., Vol. 123, No. 5, pp. 691–697).

Thus, divalent europium-activated aluminate phosphors are conventionally produced by processing a raw material for the host compound serving as the phosphor host and a trivalent europium compound in a reducing atmosphere at a high temperature, directly or after pre-firing in air at a temperature that is lower than the firing temperature for the firing in a reducing atmosphere that follows.

The flux is added to promote the chemical reaction among the raw materials. For the flux, for example, a halogenide, such as aluminum fluoride, barium fluoride, and magnesium fluoride, can be used.

Divalent europium-activated phosphors other than aluminate phosphors include halophosphate phosphors such as $Sr_{10}(PO_4)_6Cl_2:Eu^{2+}$, phosphate phosphors such as $SrMgP_2O_7:Eu^{2+}$, silicate phosphors such as $Ba_3MgSi_2O_8:Eu^{2+}$, and acid fluoride phosphors such as $SrB_4O_7F:Eu^{2+}$.

Also these other divalent europium-activated phosphors usually can be produced by firing the raw material for the phosphor in a reducing atmosphere for several hours once or after firing for several hours in air at a temperature that is lower than the firing temperature for the firing in a reducing atmosphere that follows (see "The Phosphor Handbook").

However, in this conventional method for producing a divalent europium-activated phosphor, there is the problem that in addition to the desired divalent europium-activated phosphor, also divalent europium-containing phosphor is generated. Only a small amount of this phosphor is intermingled in the mixture, but since it luminesces together with the desired divalent europium-activated phosphor, the overall luminescent color purity of the divalent europium-activated phosphor worsens.

The mixed amount of divalent europium-containing phosphor varies among the production lots and according to the furnace used, so that it is difficult to control variations of the luminescent color of the phosphor. In particular, the excitation level $4f^65d$ of the $Eu^{2+}$ ion is susceptible to influences of the crystal field, so that even a tiny variation of the structure or crystallinity of the phosphor can change the excitation level a little. Thus, variations of the luminescent color are a particular problem with divalent europium-activated phosphors emitting a high-purity blue. However, a manufacturing method that effectively suppresses the intermingling of divalent europium-containing phosphor, has yet to be conceived.

For example, when a divalent europium-activated phosphor emitting a high-purity blue is produced with the conventional method, divalent europium-containing phosphor fluorescing in a highly visible green region is also generated.

To give a specific example, when a $BaMgAl_{10}O_{17}:Eu^{2+}$ phosphor (emitting blue with a peak at 450 nm) is produced with the conventional method, a small amount of $BaAl_2O_4:Eu^{2+}$ phosphor, which is a divalent europium-containing intermediate phosphor, is intermingled. This phosphor has an emission peak in the green region at 500 nm, so that the color purity of the blue phosphor is severely worsened.

As shown in FIGS. 16(a), 16(b) and 16(c), the x- and y-value of the CIE color coordinates for the blue phosphor produced with the conventional method vary considerably among different production lots (particularly the y-value). For comparison, FIGS. 16(a), 16(b) and 16(c) also shows the variations in the luminance of the blue phosphor. FIGS. 16(a), 16(b) and 16(c) indicates that in the conventional production method, the luminance also varies considerably.

The results in FIGS. 16(a), 16(b) and 16(c) show the emission characteristics for a $Eu^{2+}$ phosphor excited with 254 nm ultraviolet light.

SUMMARY OF THE INVENTION

It is a purpose of the present invention to solve the problems of the prior art. It is a further purpose of the present invention to provide a method for producing a divalent europium-activated phosphor, wherein the variation of the luminescent color among different production lots and due to the oven can be suppressed. In particular, it is a purpose of the present invention to develop a method for producing a divalent europium-activated phosphor that can provide a blue phosphor of high color purity with high repeatability.

In order to achieve these purposes, a method for producing a divalent europium-activated phosphor in accordance with the present invention, comprises the steps of producing a host compound, wherein a raw material for the host compound is reacted; and generating a divalent europium-activated phosphor, wherein the host compound and a trivalent europium compound are reacted in a reducing atmosphere.

With this production method, variations of the luminescent color can be suppressed, and a blue phosphor of high color purity can be produced with high repeatability.

In the production method of the present invention, it is preferable that a trivalent europium compound is added to the raw material for the host compound before the host compound production step. Thus, an intermediate product that has the host compound and the trivalent europium compound as its main components can be obtained. If this intermediate product, obtained as a mixture, is further processed in a reducing atmosphere, a divalent europium-activated phosphor can be produced with high efficiency.

The effect of the production method of the present invention is particularly high, when the host compound is aluminate, and the divalent europium-activated phosphor is a divalent europium-activated aluminate phosphor.

It is preferable that the divalent europium-activated aluminate phosphor has an average particle size of 0.4 $\mu$m to 20 $\mu$m. Such a phosphor is especially suitable for fluorescent lamps and PDPs.

Moreover, it is preferable that the divalent europium-activated aluminate phosphor has a particle shape that satisfies $0.5 \leq y/x \leq 1.0$, wherein x is the maximum distance between two points A and B on the surface of a phosphor particle, and y is the minimum distance between two points C and D that are located on intersections of a perpendicular bisector bisecting a line segment connecting A and B with the surface of the phosphor particle.

Particles that satisfy the above relation are substantially spherical. Since the relative surface area of such phosphor particles is relatively small, deterioration of the phosphor due to ion bombardment when used, for example, in a fluorescent lamp can be suppressed.

It is preferable that the particle size concentration of the divalent europium-activated aluminate phosphor is 50% to 100%. It is even more preferable that the particle size concentration is 75% to 100%. The particle size concentration of the divalent europium-activated aluminate phosphor is defined as the largest value x that satisfies the equation $xA \leq d(n) \leq A/x$, wherein d(n) is the particle size of an n-th phosphor particle and A is the average particle size of the phosphor.

When the particle size concentration is high and the particle size is uniform, deterioration of the phosphor due to the above-mentioned ion bombardment can be suppressed.

It is preferable that the raw material for the host compound comprises aluminum oxide. It is preferable that this aluminum oxide has substantially the same particle shape as the divalent europium-activated aluminate phosphor. Moreover, it is preferable that the aluminum oxide has an average particle size of 0.4 $\mu$m to 20 $\mu$m.

It is preferable that the aluminum oxide has a particle shape that satisfies $0.5 \leq y/x \leq 1.0$. Moreover, it is preferable that the particle size concentration of the aluminum oxide is 50% to 100% (more preferably 75%–100%). Here, x, y, and the particle size concentration are the same as defined above.

The production method of the present invention is especially applicable when the divalent europium-activated phosphor is blue luminescent. It is also preferable that the raw material for the host compound does not include a halogenide. Moreover, it is preferable that the raw material for the host compound comprises an oxygenated compound. To be specific, it is preferable that the raw material for the host compound is selected from oxides and carbonates.

It is preferable that the divalent europium-activated phosphor in the production method of the present invention comprises a compound with the formula $(Ba_aSr_bCa_cEu_d)(Mg_eZn_fMn_g)Al_{10}O_{17}$, wherein $0<a<1$; $0 \leq b<1$; $0 \leq c<1$; $0<d<1$; $a+b+c+d=1$; $0<e \leq 1$; $0 \leq f<1$; $0 \leq g<1$; and $e+f+g=1$.

It is preferable that the host compound in the production method of the present invention comprises a compound with the formula $(Ba_aSr_bCa_c)(Mg_eZn_f)Al_{10}O_{17}$, wherein $0<a \leq 1$; $0 \leq b<1$; $0 \leq c<1$; $a+b+c=1$; $0<e \leq 1$; $0 \leq f<1$; and $e+f=1$.

It is preferable that the raw material for the host compound is reacted in an oxidizing atmosphere, because in an oxidizing atmosphere, trivalent europium is more stable than divalent europium.

In more detail, it is preferable that the raw material for the host compound is reacted in an oxidizing atmosphere of at least 1500° C. It is also preferable that the raw material for the host compound is reacted in an oxidizing atmosphere of at not more than 1900° C. More preferable are temperatures above 1600° C., and even more preferable are temperatures above 1650° C. Moreover, temperatures below 1800° C. are preferable and temperatures below 1700° C. are even more preferable.

It is preferable that the oxidizing atmosphere is simply air. On the other hand, it is preferable that the reducing atmosphere is a gaseous mixture of nitrogen and hydrogen, because such a mixture is easy to prepare and has great reducing power.

In accordance with the present invention, the intermingling of undesired divalent europium-containing phosphor with the desired divalent europium-activated phosphor can be avoided. Consequently, variations of the luminescence color among the production lots or due to the electric oven can be suppressed. Moreover, a phosphor with high color purity can be provided with good repeatability.

BRIEF DESCRIPTION OF THE DRAWINGS

FIG. 1 is a flowchart of an embodiment of the method for producing a divalent europium-activated phosphor in accordance with the present invention.

FIG. 2 is flowchart of another embodiment of the method for producing a divalent europium-activated phosphor in accordance with the present invention.

DESCRIPTION OF THE PREFERRED EMBODIMENTS

Figure 3:
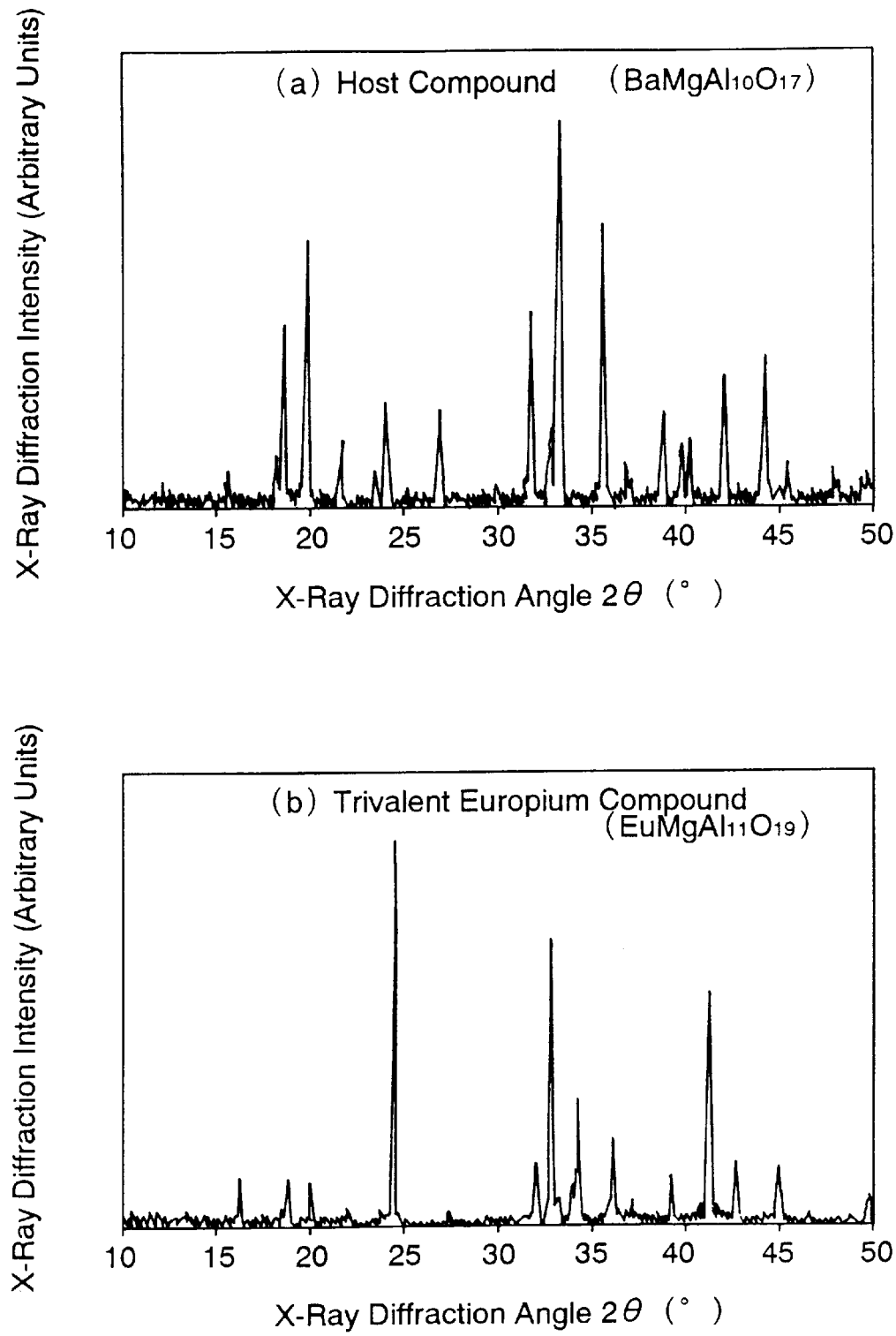
FIGS. 3(a) and 3(b) shows the X-ray diffraction patterns of the host compound and the trivalent europium compound obtained by the first embodiment of the present invention.

The following is a description of the preferred embodiments of the present invention with reference to the accompanying drawings.

First Embodiment

FIG. 1 is a flowchart of the production method according to a first embodiment of the present invention.

First of all, in the host compound production step in FIG. 1, a host compound serving as the phosphor host is produced.

As raw materials for the host compound, a barium compound (for example, barium oxide, barium carbonate, barium nitrate, barium hydrogenphosphate, barium chloride, barium fluoride), a strontium compound (for example, strontium oxide, strontium carbonate, strontium nitrate, strontium hydrogenphosphate, strontium chloride, strontium fluoride), a calcium compound (for example, calcium oxide, calcium carbonate, calcium hydrogenphosphate, calcium chloride, calcium fluoride), a magnesium compound (for example, magnesium oxide, magnesium carbonate, basic magnesium carbonate, magnesium fluoride), a phosphor compound (for example, ammonium hydrogenphosphate, phosphorous pentoxide), a chlorine compound (for example, ammonium chloride), a fluorine compound (for example, ammonium fluoride), a boron compound (for example, boron oxide, boric acid), a manganese compound (for example, manganese carbonate, metallic manganese), a zinc compound (for example, zinc oxide, zinc chloride, zinc fluoride, metallic zinc), an aluminum compound (for example, aluminum oxide, aluminum fluoride), a silicon compound (for example, silicon dioxide, silicon nitride), or a rare earth compound other than a europium compound (for example, cerium oxide, terbium oxide, yttrium oxide, lanthanum oxide) can be used.

After the raw materials have been mixed in a certain proportion, the raw materials are chemically reacted to produce the host compound. It is preferable to perform this chemical reaction in an oxidizing atmosphere, such as air.

Examples for the host compound thus produced include aluminate phosphor hosts, such as $BaMgAl_{10}O_{17}$, and $(Ba,Sr)MgAl_{10}O_{17}$, halophosphate phosphor hosts, such as $Sr_{10}(PO_4)_6Cl_2$, phosphate phosphor hosts, such as $SrMgP_2O_7$, silicate phosphor hosts, such as $Ba_3MgSi_2O_8$, and acid fluoride phosphor hosts, such as $SrB_4O_7$.

On the other hand, in the trivalent europium production step in FIG. 1, a trivalent europium compound is produced.

This step produces a trivalent europium compound by (a) mixing at a certain proportion, for example, a europium compound (such as, europium oxide, europium fluoride, or europium chloride) with a raw material, such as one of the aluminum compounds, the magnesium compounds, the phosphor compounds, the silicon compounds, or the boron compounds described above and (b) chemically reacting the raw materials.

Examples for the thusly produced trivalent europium compound include $AlEuO_3$, $EuMgAl_{11}O_{19}$, $EuPO_4$, $EuP_3O_9$, $EuOCl$, $EuCl_3$, $Eu_2PCl$, $Eu_2SiO_5$, $Eu_2SiO_7$, $EuF_3$, and $EuBO_3$.

However, it is also possible to directly use europium oxide, europium fluoride, europium chloride, etc. for the trivalent europium compound.

In the mixing step in FIG. 1, the host compound produced in the host compound production step and the trivalent europium compound are mixed to obtain a mixture having a host compound and a trivalent europium compound as its main components. To be specific, the host compound and the trivalent europium compound can be mixed with a mixer, for example, a ball mill or an automatic mortar.

In the divalent europium-activated phosphor generation step in FIG. 1, the desired divalent europium-activated phosphor is produced. This phosphor is produced using a phosphor production device (for example, an electric furnace with adjustable atmosphere).

To obtain the divalent europium-activated phosphor, the mixture is fired in a reducing atmosphere. It is preferable that the reducing atmosphere is a gaseous mixture of nitrogen and hydrogen.

The disintegrating step in FIG. 1 breaks up and disintegrates agglomerations of the divalent europium-activated phosphor. In other words, the produced divalent europium-activated phosphor is disintegrated with a disintegrator, for example a ball mill, an automatic mortar or a jet mill, to separate the particles.

The sieving step in FIG. 1 eliminates very large particles from the large and small divalent europium-activated phosphor particles obtained in the disintegrating step. Moreover, the particle sizes are equalized. To be specific, the disintegrated divalent europium-activated phosphor is sieved with a sieving device.

The rinsing step in FIG. 1 eliminates very small particles, soluble impurities, dirt, etc. from the sieved divalent europium-activated phosphor. To be specific, the divalent europium-activated phosphor is rinsed with, for example, pure water or an organic solvent.

The drying step in FIG. 1 eliminates the remaining water or organic solvent from the rinsed divalent europium-activated phosphor. To be specific, the divalent europium-activated phosphor is dried with a dry oven.

Then, the final sieving step in FIG. 1 finally classifies the dried divalent europium-activated phosphor. To be specific, the dried divalent europium-activated phosphor is sieved with a sieving device.

Thus, in this embodiment, first, a host compound serving as a phosphor host and a trivalent europium compound are produced separately, and a mixture of the two is reacted to obtain a divalent europium-activated phosphor. With this method, the production of divalent europium-containing phosphor in addition to the desired divalent europium-activated phosphor can be suppressed.

As a result, the desired luminescent color of the divalent europium-activated phosphor can be attained with higher color purity. Other effects are that variation of the luminescent color among the lots due to variations of the intermingled amount of divalent europium-containing intermediate phosphor or the used electric furnace can be considerably improved.

As has been explained above, the production method of the present embodiment contains a step for producing a host compound by reacting a raw material for the host compound, which serves as a phosphor host, a step for preparing a mixture having the produced host compound and a trivalent europium compound as its main components, and a step for generating a divalent europium-activated phosphor by reacting the host compound comprised in the mixture and the trivalent europium in a reducing atmosphere.

As long as the purpose of the present invention is still attained, steps can be partially added, changed or even deleted.

Second Embodiment

FIG. 2 is a flowchart of another embodiment of a production method according to the present invention.

The phosphor raw material mixing step of FIG. 2 adjusts the raw material for the phosphor. For the raw material for the phosphor, the raw material for the host compound and the trivalent europium compound mentioned in the first embodiment can be used. For the trivalent europium compound, for example europium oxide, europium fluoride or europium chloride can be used. The raw materials are mixed with a mixer, such as a ball mill or an automatic mortar, and adjusted to obtain a certain proportion.

The intermediate production step in FIG. 2 generates the host compound serving as the phosphor host. In other words, the raw materials for the host compound are chemically reacted to produce the host compound. It is preferable that this chemical reaction is performed in an oxidizing atmosphere, such as air.

Consequently, the main components of the intermediate product that is produced with this step are the host compound and the trivalent europium compound. Examples for the host compound thus produced are the same compounds as in the first embodiment.

Examples for the trivalent europium compound comprised in the intermediate product include $AlEuO_3$, $EuMgAl_{11}O_{19}$, $EuPO_4$, $EuP_3O_9$, $EuOCl$, $EuCl_3$, $Eu_2PCl$, $Eu_2SiO_5$, $Eu_2SiO_7$, $EuF_3$, and $EuBO_3$.

The divalent europium-activated phosphor generation step in FIG. 2 produces the desired divalent europium-activated phosphor by firing the intermediate product in a reducing atmosphere. The disintegrating step, the sieving step, the rinsing step, the drying step, and the final sieving step of FIG. 2 are the same as explained for the first embodiment.

Divalent europium compounds are not generated when reacting the raw materials for the phosphor, which have been mixed at a certain proportion, in the intermediate production step in an oxidizing atmosphere as explained above. This is, because in an oxidizing atmosphere, such as air, trivalent europium is chemically more stable than divalent europium. Therefore, the intermediate production step produces an intermediate product comprising a host compound serving as the phosphor host, and a trivalent europium compound.

It is preferable that the raw materials for the phosphor are mixed in the phosphor raw material mixing step at a certain mol proportion corresponding to the atomic proportion of the divalent europium-activated phosphor. If the raw materials are mixed like this, an intermediate product having the host compound and the trivalent europium compound as its main components can be obtained.

Furthermore, in the divalent europium-activated phosphor generation step, as in the first embodiment, a divalent europium-activated phosphor can be attained while suppressing the generation of divalent europium-containing intermediate phosphor in addition to the desired divalent europium-activated phosphor.

As a result, the desired luminescent color of the divalent europium-activated phosphor can be attained with higher color purity. Other effects are that variation of the luminescent color among the lot due to variations of the intermingled amount of divalent europium-containing intermediate phosphor or the used electric furnace can be considerably improved.

As has been explained above, the production method of the present embodiment contains a step for adjusting the raw materials for the phosphor including the raw material for the host compound serving as the phosphor host and a trivalent europium compound, a step for producing an intermediate product containing the host compound and the trivalent europium compound by processing the raw material for the phosphor in an oxidizing atmosphere and react the raw material for the host compound, and a step for generating the divalent europium-activated phosphor by processing the intermediate product in a reducing atmosphere, so that the host compound and the trivalent europium compound are reacted.

As long as the purpose of the present invention is still attained, steps can be partially added, changed or even deleted. For example, in the intermediate production step, other methods besides firing in an oxidizing atmosphere are possible, as long as a host compound similar to the one above is obtained. Moreover, a disintegrating step can be added after the intermediate production step.

EXAMPLE 1

The method for producing a divalent europium-activated aluminate blue phosphor, as expressed by the chemical formula $Ba_{0.9}Eu_{0.1}MgAl_{10}O_{17}$ was executed following the method explained in the first embodiment.

Raw materials without halogen compounds were used for the phosphor's raw material. The raw materials used were barium carbonate (3 $\mu$m average particle size, 99.98% purity), europium oxide (3 $\mu$m average particle size, 99.99% purity), basic magnesium carbonate (2 $\mu$m average particle size, 99.99% purity), and aluminum oxide (2 $\mu$m average particle size, 99.99% purity).

First of all, in the step for producing the host compound as expressed by the chemical formula $BaMgAl_{10}O_{17}$, 197 g barium carbonate, 95.69 g basic magnesium carbonate, and 510 g aluminum oxide were mixed for one hour in an automatic mortar. This raw material for the host compound was put into an alumina boat, deposited in an electric box furnace, and fired in air for two hours. The firing temperature was 1600° C.

In the step for producing a trivalent europium compound, 176 g europium oxide, 95.6 g basic magnesium carbonate, and 561 g aluminum oxide were mixed for one hour in an automatic mortar. This raw material was put into an alumina boat, deposited in an electric box furnace, and fired in air for two hours. The firing temperature was 1800° C.

FIG. 3(a) is an X-ray diffraction pattern of the material produced in the host compound production step, and FIG. 3(b) is an X-ray diffraction pattern of the material produced in the trivalent europium compound production step. FIG. 3(a) shows that the material produced in the host compound production step is $BaMgAl_{10}O_{17}$. FIG. 3(b) shows that the material produced in the trivalent europium compound production step is $EuMgAl_{11}O_{19}$.

Then, as the mixing step, 633 g of the host compound ($BaMgAl_{10}O_{17}$), 77.1 g of the trivalent europium compound ($EuMgAl_{11}O_{19}$), and small amounts of barium carbonate (1.76 g), europium oxide (0.174 g), and basic magnesium carbonate (0.952 g) were mixed for one hour in an automatic mortar.

The reason why barium carbonate, europium oxide, and basic magnesium carbonate are added is to adjust the mixture so that the stoichiometric ratio of the desired divalent europium-activated aluminate phosphor ($Ba_{0.9}Eu_{0.1}MgAl_{10}O_{17}$) becomes Ba:Eu:Mg:Al= 0.9:0.1:1:10. If only 0.9 mol $BaMgAl_{10}O_{17}$ is mixed with 0.1 mol $EuMgAl_{11}O_{19}$, the stoichiometric ratio becomes Ba:Eu:Mg:Al=0.891:0.0990:0.990:10.

Then, in the divalent europium-activated phosphor generation step, this mixture was put into an alumina boat, deposited in a tubular atmospheric furnace, and fired for two hours in a reducing atmosphere consisting of a gaseous mixture of nitrogen and hydrogen. The firing temperature was 1600° C. The flow of the nitrogen and the hydrogen was set to 380 cc/min and 20 cc/min respectively.

This divalent europium-activated aluminate phosphor ($Ba_{0.9}Eu_{0.1}MgAl_{10}O_{17}$) was produced ten times under exactly the same conditions. The luminance, chromaticity, and crystalline structure of the thusly produced phosphors were evaluated with a luminance meter, a chromaticity evaluator and an X-ray diffractometer.

For the evaluation of the luminance and the chromaticity, a low-pressure mercury lamp was used, and the phosphor was irradiated with ultra-violet light of 254 nm wavelength.

For comparison, 178 g barium carbonate, 17.6 g europium oxide, 95.6 g basic magnesium carbonate, and 510 g aluminum oxide were mixed for one hour in an automatic mortar. This mixture was fired for two hours in a reducing atmosphere consisting of a gaseous mixture of nitrogen and hydrogen. This conventionally produced divalent europium-activated aluminate phosphor ($Ba_{0.9}Eu_{0.1}MgAl_{10}O_{17}$) was evaluated in the same manner as explained above. The conditions for firing in a reducing atmosphere were also the same as above.

The sieving step, the rinsing step, the drying step, and the final sieving step shown in FIG. 1 have been omitted.

Figure 4:
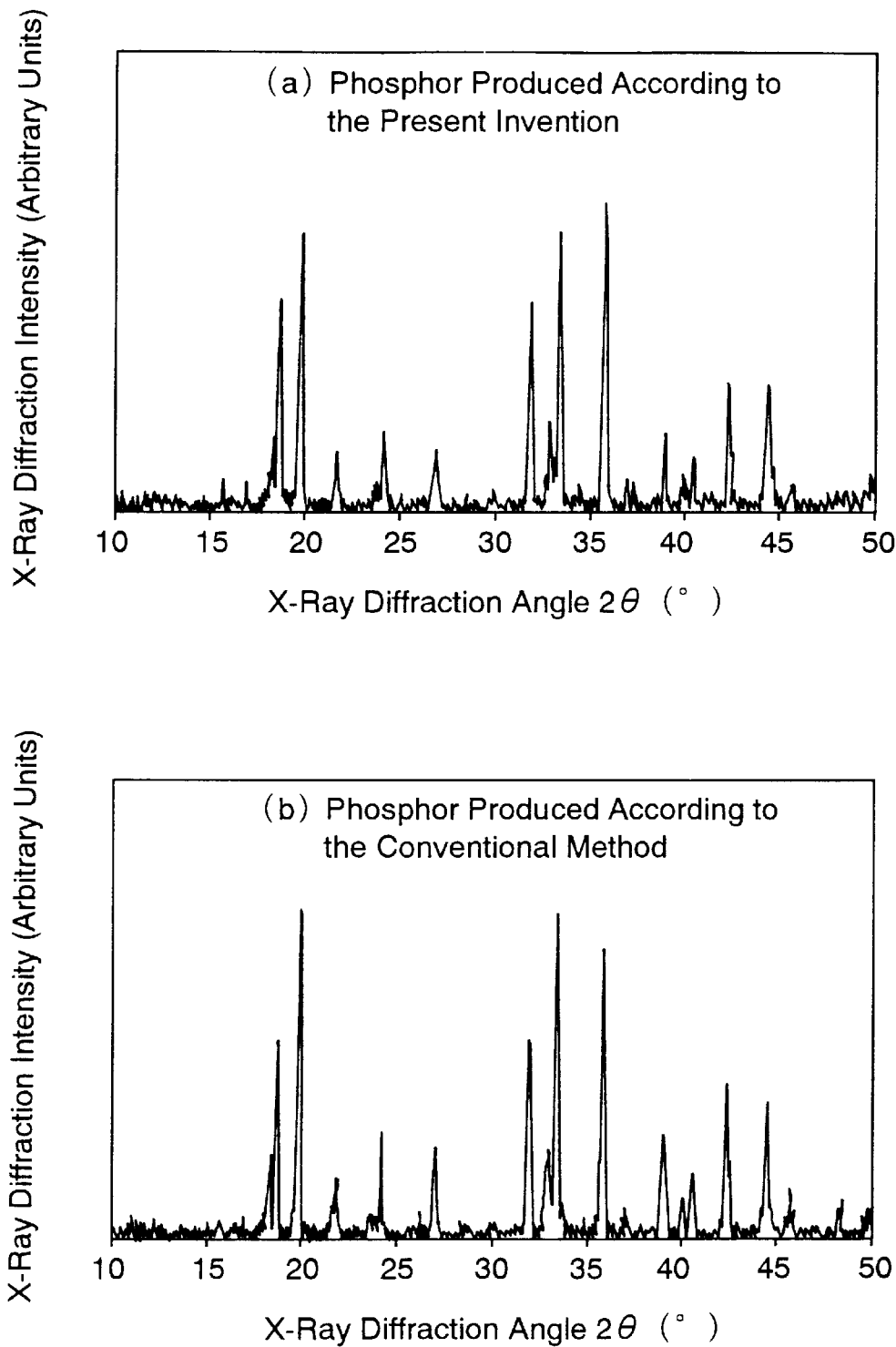
FIGS. 4(a) and 4(b) shows the X-ray diffraction patterns of a phosphor by the first embodiment of the present invention and a phosphor obtained with a conventional production method.

FIG. 4(a) is an X-ray diffraction pattern of the phosphor produced with the production method in accordance with the present invention, and FIG. 4(b) is an X-ray diffraction pattern of the phosphor produced with the conventional production method.

The X-ray patterns shown in FIGS. 4(a) and (b) are both XRD (X-ray diffraction) pattern characteristic for $Ba_{0.9}Eu_{0.1}MgAl_{10}O_7$. Consequently, both phosphors are divalent europium-activated aluminate phosphors with the chemical formula $Ba_{0.9}Eu_{0.1}MgAl_{10}O_{17}$.

FIG. 5(a) shows the variation among different production lots of the luminance for phosphors produced with the production method of the present invention, and FIG. 5(b) shows the variation of the luminance for phosphors produced with a conventional production method.

As can be seen from FIGS. 5(a) and (b), the luminance variations of the phosphor can be better suppressed with the production method of Example 1 than with the conventional production method.

Thus, it can be seen that the present invention considerably lowers the luminance variation among different production lots, which has become a big problem in conventional divalent europium-activated phosphor production methods.

FIG. 6(a) shows the variation among different production lots in the y-value of the CIE color coordinates of the luminescent color of phosphors that have been produced in accordance with Example 1. FIG. 6(b) shows the variation among different production lots of the y-value of the CIE color coordinates of the luminescent color of phosphors produced with the conventional production method.

Figure 7:
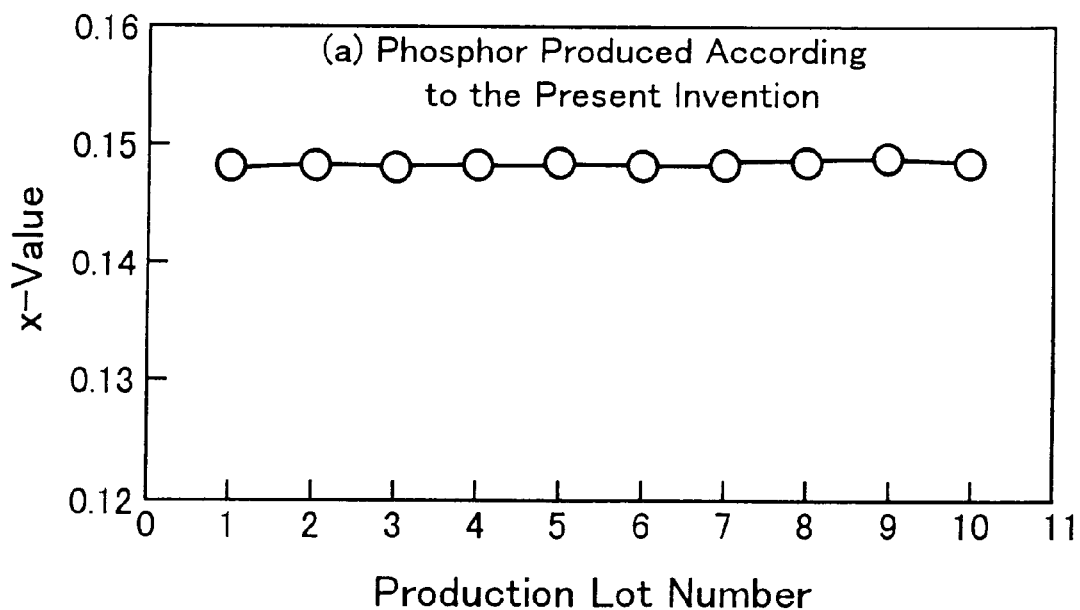
FIGS. 7(a) and 7(b) shows the variation among different production lots for the x-value of a) phosphors produced with the first embodiment of the present invention and b) phosphors produced with the conventional production method.
Figure 7:
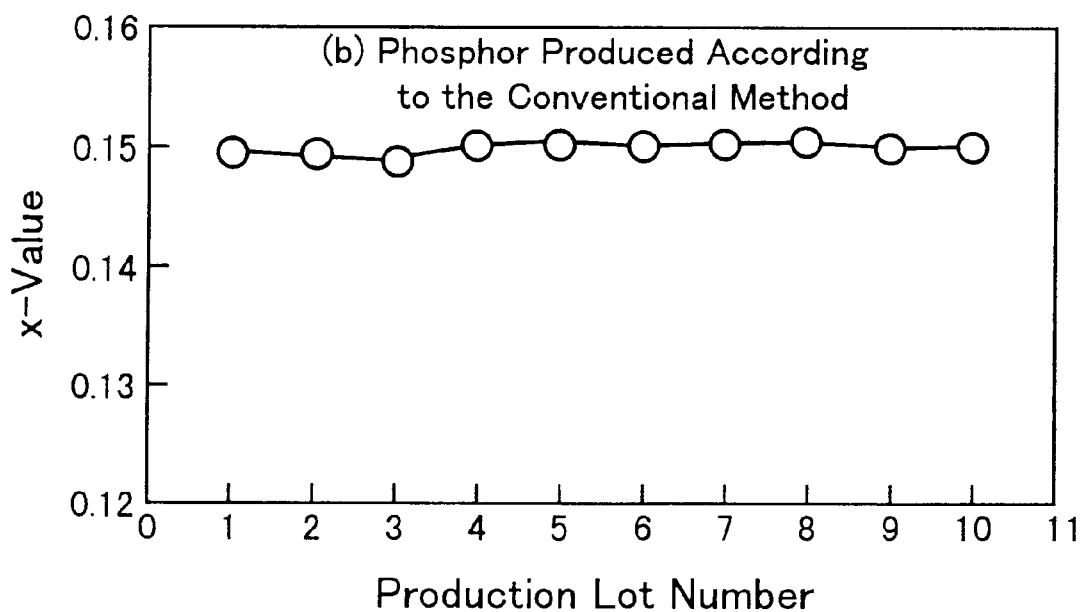

Similarly, FIG. 7(a) shows the variation among different production lots in the x-value of the CIE color coordinates of the luminescent color of phosphors that have been produced in. accordance with Example 1, and FIG. 7(b) shows the variation among different production lots of the x-value of the CIE color coordinates of the luminescent color of phosphors produced with the conventional production method.

As is shown in FIGS. 6(a) and (b) and FIGS. 7(a) and (b), the variation of the x- and y-value of the CIE color coordinates of the phosphor, especially the variation of the y-value, can be better suppressed with the production method of Example 1 than with the conventional production method.

The large variation of the y-value among different production lots of the phosphor shows that it is difficult to produce a blue phosphor with a constant luminescent color when the firing temperature at production time is not controlled with utmost rigidity. In this case, i.e. when the firing temperature at production time is not controlled with utmost rigidity, the luminescent color of the blue phosphor varies from pure blue to greenish blue. If, on the other hand, there is almost no change in the y-value among different production lots of the phosphor, this means that a blue phosphor with constant luminescent color can be produced, even when the firing temperature at production time is not controlled with utmost rigidity.

In the mass production of phosphors, there are always factors such as seasonal variations of the temperature, variations of the amount of phosphor to be produced, the wear of the electric furnace used, the kind of electric furnace, differences among the operating methods of different operators, or variations in the particle size of the powder used as raw material for the phosphor. In reality, it is very difficult to control the production conditions of the phosphor with utmost rigidity.

However, with the method of Example 1, a phosphor with very stable luminescent color can be produced even when the production conditions are not controlled with utmost rigidity.

Comparing the smallest y-values in FIGS. 6(a) and (b), it can be seen that the smallest y-value for the production method of the present invention is 0.0549, and the smallest y-value for the conventional production method is 0.0570.

A large y-value means that the color purity of blue of the phosphor is poor, and the luminescent color is greenish.

Thus, the production method of the present invention provides a blue phosphor with better color purity than the conventional production method.

Figure 5:
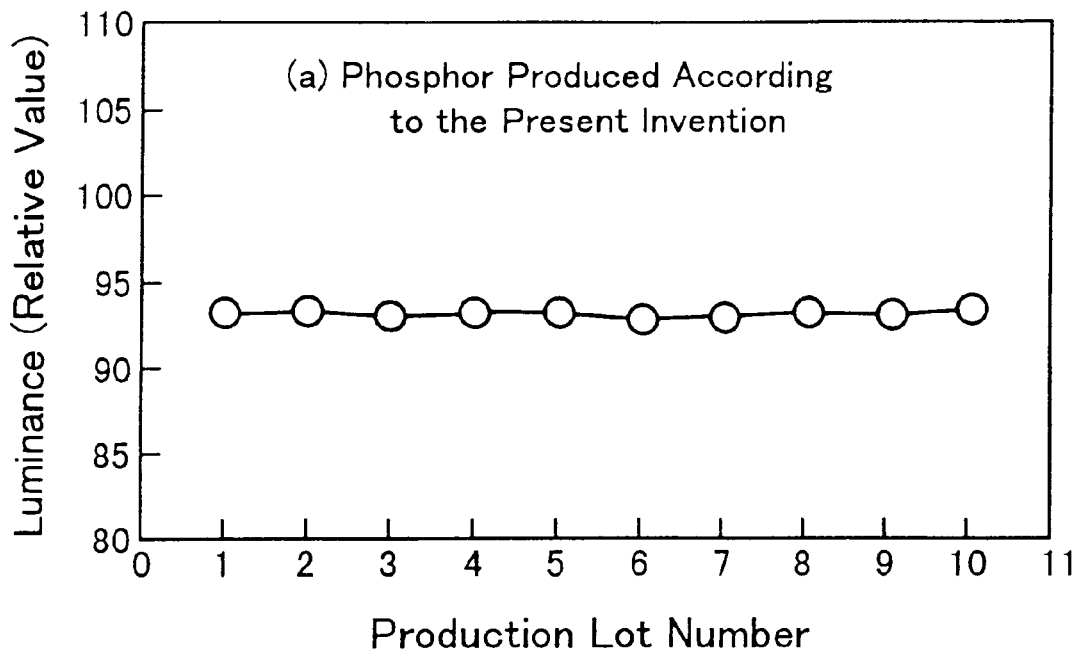
FIGS. 5(a) and 5(b) shows the variation among different production lots for the luminance of a) phosphors produced with the first embodiment of the present invention and b) phosphors produced with the conventional production method.
Figure 5:
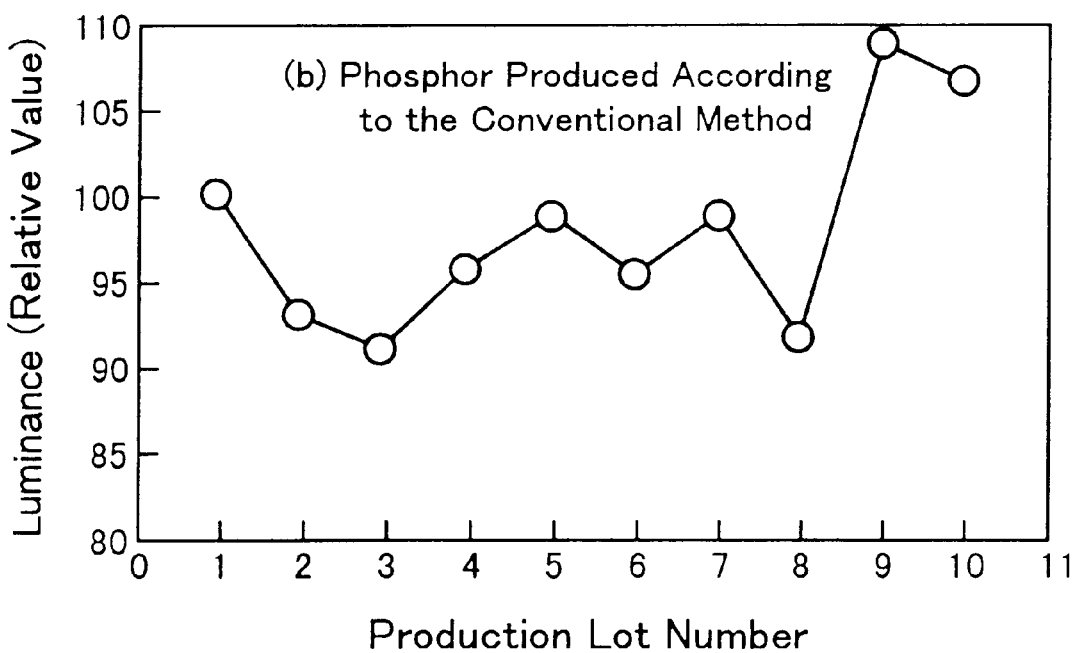
Figure 6:
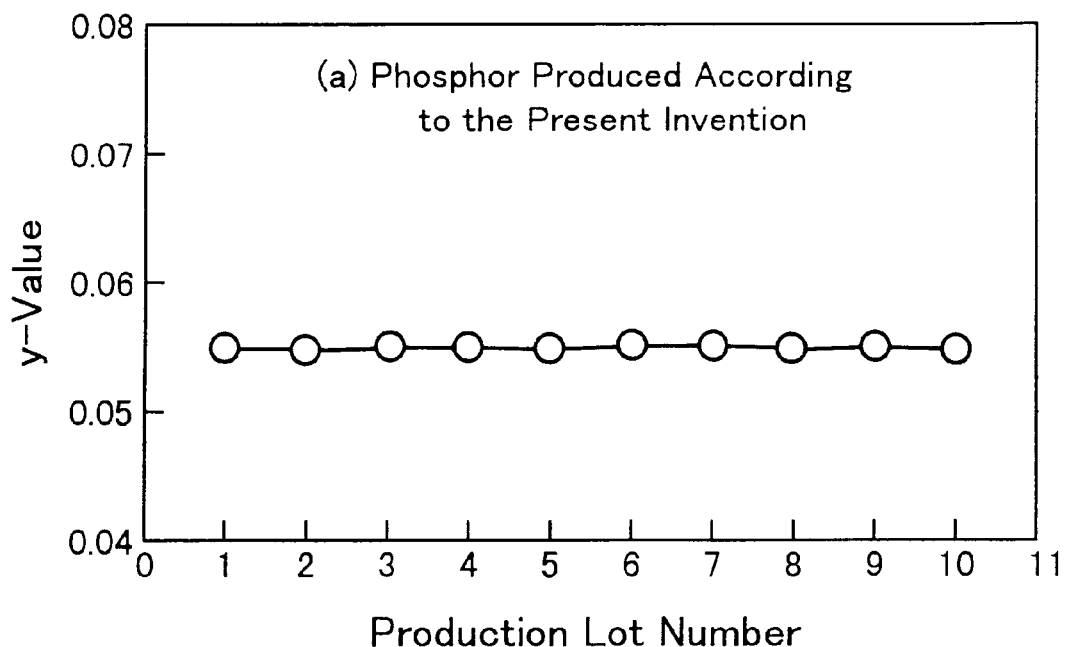
FIGS. 6(a) and 6(b) shows the variation among different production lots for the y-value of a) phosphors produced with the first embodiment of the present invention and b) phosphors produced with the conventional production method.
Figure 6:
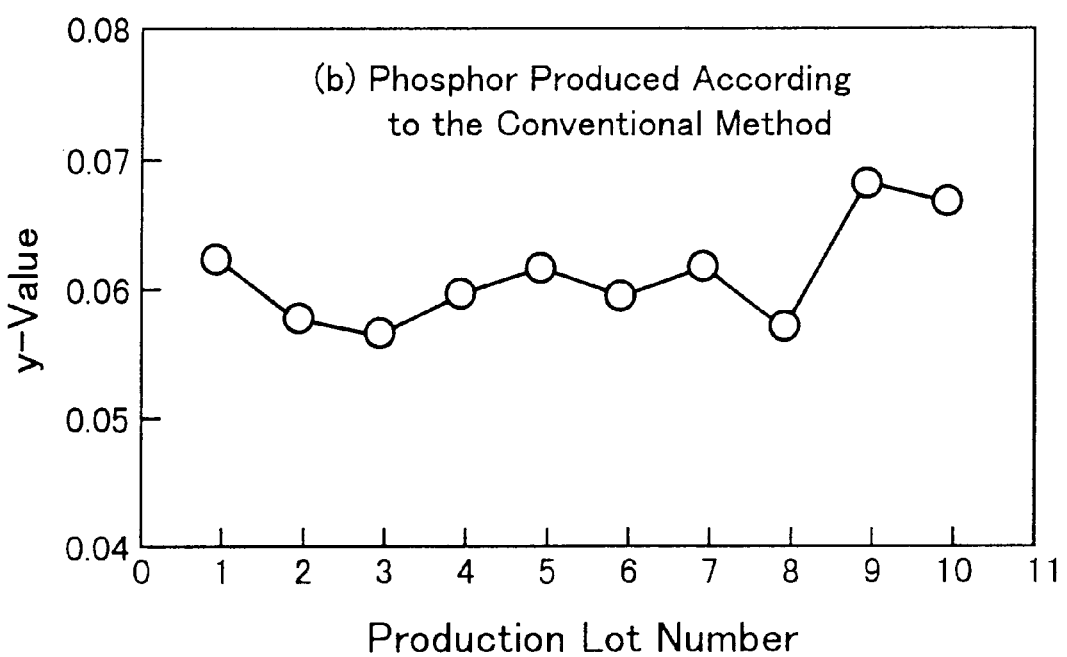

When the absolute values of the luminance and the y-coordinate in FIGS. 5 and 6 are considered, it can be seen that although the y-value of the phosphor produced in accordance with the present invention is small, its luminance is the same as that of a phosphor produced with the conventional method.

For example, comparing the samples of production lot No. 2, the y-value of the phosphor produced in accordance with the present invention is 0.0549, whereas the y-value of the phosphor produced according to the conventional method is 0.0578. However, the relative luminance is the same (93.1%) for both phosphors.

If the influence of the luminosity factor on the luminance is corrected, it can be seen that, for the same luminescent color, the phosphor produced in accordance with the present invention has a luminance that is roughly 5% higher than the phosphor produced in accordance with the conventional production method. Thus, a blue phosphor can be provided that, comparing the same luminescent color, has a luminous efficacy that is about 5% higher than for a phosphor produced with the conventional production method.

In order to verify this point, the external quantum efficiency of the phosphor was measured when irradiating it with light of an excitation wavelength of 254 nm. The result was that while the external quantum efficiency of the phosphor produced with the conventional method was only ca. 73%, the external quantum efficiency of the phosphor produced with the method in accordance with Example 1 was ca. 76%.

Thus, with the production method of the present invention, a blue phosphor can be provided whose external quantum efficiency (that is, luminance), compared at the same luminescent color, is about 4% higher than that of a phosphor produced with the conventional method.

One reason that the luminous efficacy of the phosphor produced according to the present invention is better than that of the phosphor produced according to the conventional method, may be because the crystallinity of the phosphor host is improved by firing the host compound of the phosphor two times.

EXAMPLE 2

The method for producing a divalent europium-activated aluminate blue phosphor, as expressed by the chemical formula $Ba_{0.9}Eu_{0.1}MgAl_{10}O_{17}$ was executed following the method explained in the second embodiment.

The same raw material as in Example 1 was used.

Figure 8:
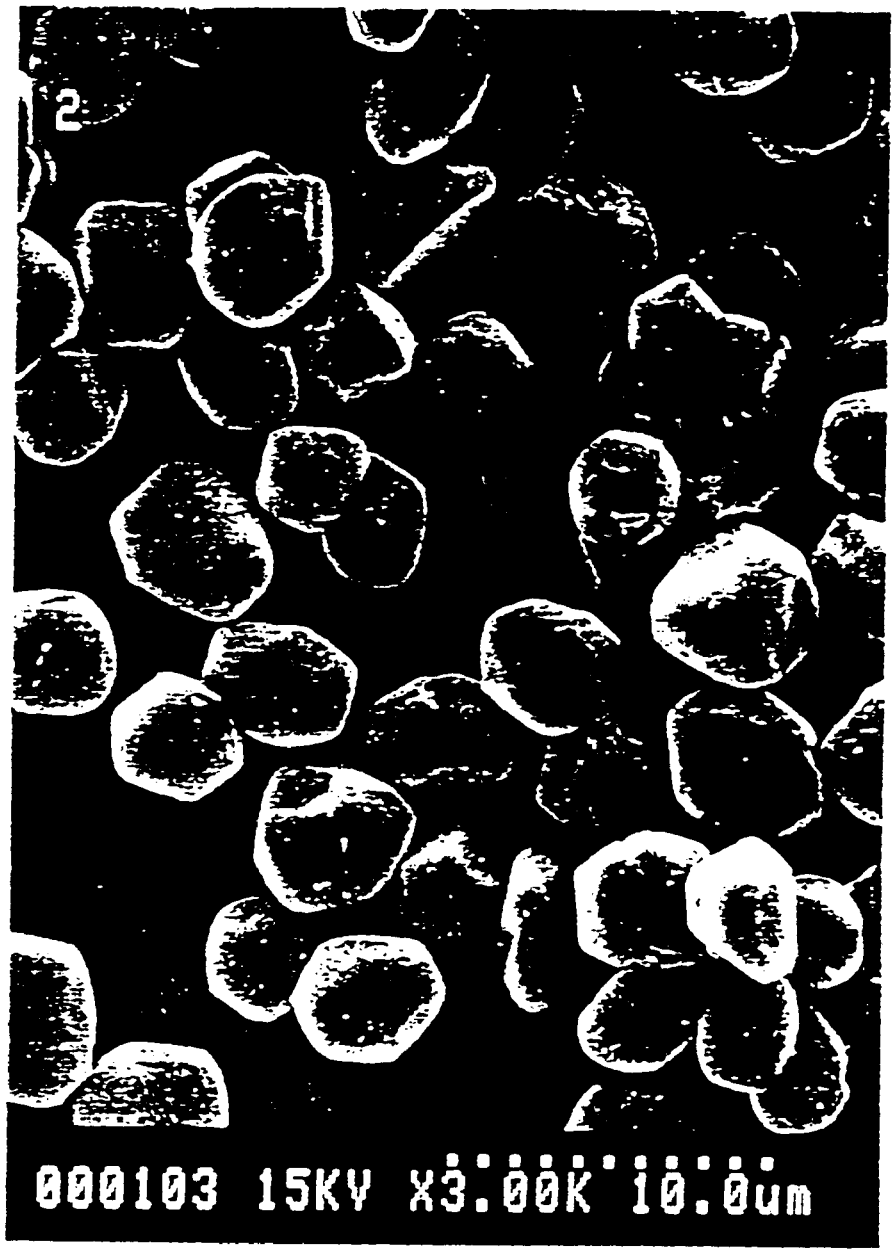
FIG. 8 is a micrograph of the $Al_2O_3$ used in Example 2 of the present invention, taken with a scanning electron microscope.

However, an aluminum oxide ($\alpha$-$Al_2O_3$) with a particle size concentration of 80% was used for the aluminum oxide. For this alumina oxide, for example, "Advanced Alumina—Sumicorondum" (Sumitomo Chemical Co., Ltd.), which is readily available on the market, can be used. This advanced alumina is a mono-crystalline aluminum oxide that has practically no fractured surface. It can be seen from FIG. 8 that this aluminum oxide (advanced aluminum) has a particle shape satisfying $0.5 \leq y/x \leq 1.0$. In this equation, x is the maximum distance between two points A and B on the surface of a phosphor particle, and y is the minimum distance between two points C and D that are located on intersections of a perpendicular bisector bisecting a line segment connecting A and B with the surface of the phosphor particle. FIG. 8 shows a micrograph of this aluminum oxide taken with a scanning electron microscope.

First of all, in the phosphor raw material mixing step, 178 g barium carbonate, 17.6 g europium oxide, 95.6 g basic magnesium carbonate, and 510 g aluminum oxide were mixed together for one hour in an automatic mortar.

Then, in an intermediate production step, this mixture was put into an alumina boat, deposited in an electric box furnace, and fired for two hours in air. The firing temperature was 1650° C.

Then, in the divalent europium-activated phosphor generation step, the fired intermediate product obtained by the above steps was put into an alumina boat, deposited in a tubular atmospheric furnace, and fired for two hours in a reducing atmosphere consisting of a gaseous mixture of nitrogen and hydrogen. Before firing, the intermediate product was lightly disintegrated using a mortar and a pestle. The flow of the nitrogen and the hydrogen was set to 380 cc/min and 20 cc/min respectively.

The divalent europium-activated aluminate phosphor ($Ba_{0.9}Eu_{0.1}MgAl_{10}O_{17}$) was produced with different firing temperatures from 1200° C. to 1700° C. at steps of about 100° C. The luminance, chromaticity, crystalline structure, and particle shape of the phosphors thus produced were evaluated with a luminance meter, a chromaticity evaluator, an X-ray diffraction method, and a scanning electron microscope.

For the evaluation of the luminance and the chromaticity, a low-pressure mercury lamp was used, and the phosphor was irradiated with ultra-violet light of 254 nm wavelength.

For comparison, a phosphor was produced in the same manner, except for the fact that the intermediate production step was omitted. This phosphor was obtained by directly firing the raw materials for the phosphor in a reducing atmosphere, without firing them in air at high temperatures.

Also in this embodiment, the sieving step, the rinsing step, the drying step, and the final sieving step have been omitted.

FIG. 9(a) shows the X-ray diffraction pattern of the intermediate product after it has been fired in air with the intermediate production step.

This X-ray diffraction pattern consists of the XRD pattern characteristic for $BaMgAl_{10}O_{17}$ (see FIG. 9(b)) and the XRD pattern characteristic for $AlEuO_3$ (see FIG. 9(c)). Thus, the intermediate product fired by the intermediate production step has $BaMgAl_{10}O_{17}$ and $AlEuO_3$ as its main components.

The body color of $AlEuO_3$ in its disintegrated state, which is a trivalent europium compound containing trivalent europium and aluminum, is a darkish brown. It is a nonluminescent material that shows no luminescence when irradiated with ultra-violet light of 254 nm wavelength.

Figure 10:
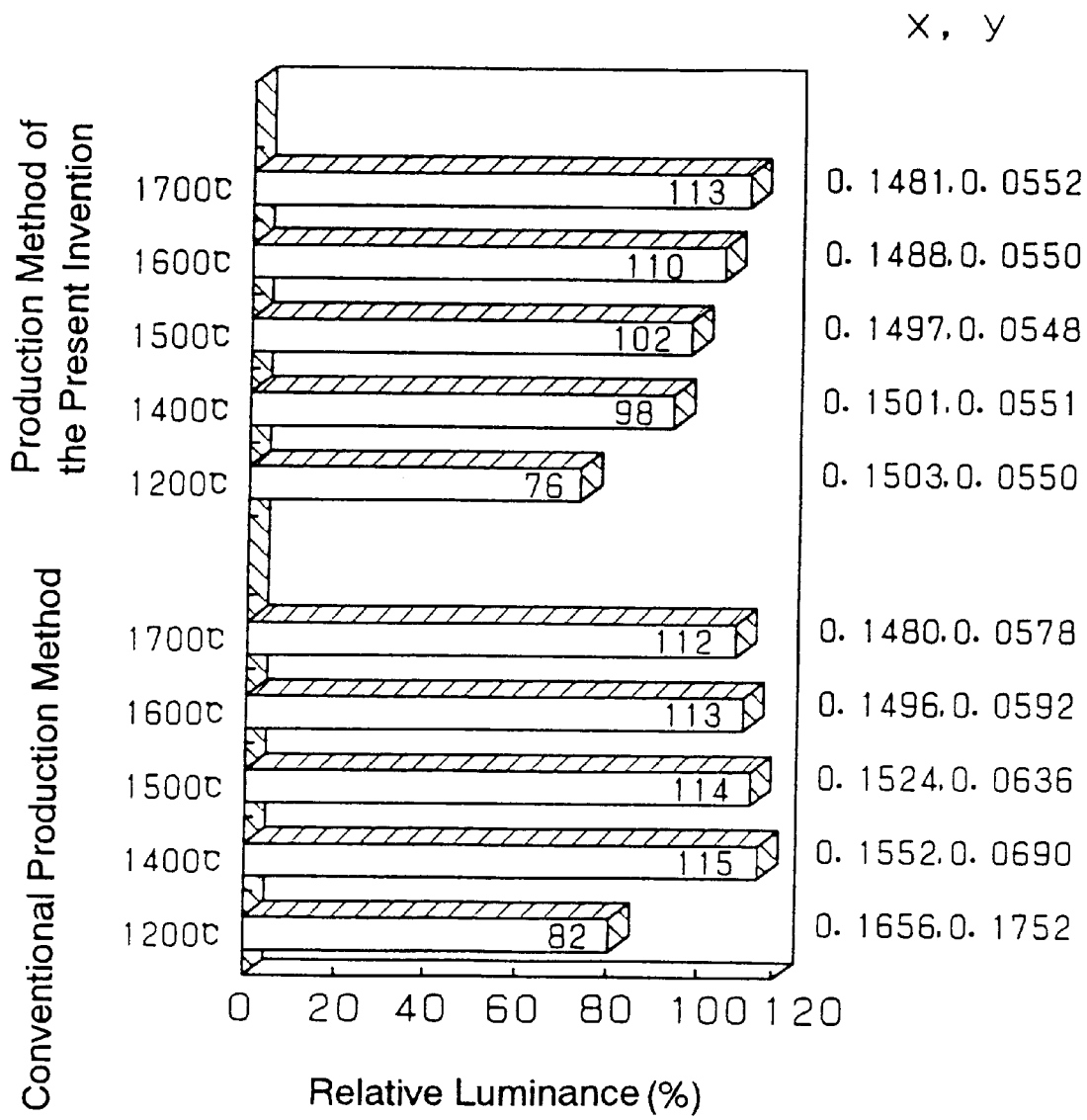
FIG. 10 is a diagram comparing the luminance and the chromaticity of the phosphor obtained with Example 2 of the present invention and the phosphor produced according to the conventional method.

FIG. 10 shows a comparison of the luminance, and the x-value and the y-value of the CIE color coordinates for the phosphor produced according to the method of Example 2 and the phosphor produced according to the conventional method.

FIG. 10 shows the dependency of the luminance, and the x-value and the y-value from the firing temperature of the reducing atmosphere in the above-mentioned range.

FIG. 10 shows the change of the luminance and the x-value and the y-value of the CIE color coordinates when the firing temperature of the reducing atmosphere was varied between 1200° C. and 1700° C. in steps of 100° C. The y-value of the phosphor that was produced according Example 2 varied in the small range of 0.0548 to 0.0552, whereas the y-value of the phosphor that was produced according to the conventional method varied much more over a range of 0.0578 to 0.1752 when the firing temperature was increased.

A large variation of the y-value for different firing temperatures means that it is difficult to produce a blue phosphor with a constant luminescent color when the firing temperature at production time is not controlled with utmost rigidity. In this case, i.e. when the firing temperature at production time is not controlled with utmost rigidity, the luminescent color of the blue phosphor varies from pure blue to greenish blue. If, on the other hand, there is almost no change in the y-value for different firing temperatures, this means that a blue phosphor with constant luminescent color can be produced, even when the firing temperature at production time is not controlled with utmost rigidity.

As has been explained for Example 1, in mass production of phosphors, it is very difficult to control the production conditions for phosphors with utmost rigidity.

However, with the production method of the present invention, a phosphor with very stable luminescent color can be produced even when the firing temperature at production time is not controlled with utmost rigidity.

Comparing the smallest y-values in FIG. 10, it can be seen that the smallest y-value for the production method of the present invention is 0.0548, and the smallest y-value for the conventional production method is 0.0578.

As has been explained for Example 1, large y-values mean that the color purity of blue of the phosphor is poor, and the luminescent color is greenish. Thus, the production method of the present invention provides a blue phosphor with better color purity than the conventional production method.

With FIG. 10, the relative luminance of phosphors that were produced at the same firing temperature can be compared. For example, in the case of phosphors fired in a reducing atmosphere at 1600° C., the relative luminance of the phosphor produced with the conventional method is 113, whereas the relative luminance of the phosphor produced with the method in accordance with the present invention is 110.

In other words, when the relative luminance of a phosphor produced with the conventional method is taken to be 100, then the relative luminance of a phosphor produced with the method of the present invention corresponds to 97.3.

However, since the y-value of the two phosphors is different, the luminescent color is also different. If this is taken into consideration and the influence of the luminosity factor on the luminance is corrected, then it can be seen that, for the same luminescent color, the phosphor produced in accordance with the present invention has a luminance that is about 5% higher than that of the phosphor produced with the conventional method.

Thus, as in Example 1, the production method of the present invention can provide a blue phosphor with a luminous efficacy that is about 5% higher than that of a phosphor produced with the conventional method, when compared at the same luminescent color.

In order to verify this point, the external quantum efficiency of the phosphor was measured when irradiating it with light of an excitation wavelength of 254 nm. The result was that while the external quantum efficiency of the phosphor produced with the conventional method was only ca. 73%, the external quantum efficiency of the phosphor produced with the method in accordance with the present invention was ca. 76%.

Thus, with the production method of the present invention, a blue phosphor can be provided whose external quantum efficiency (that is, luminance), compared at the same luminescent color, is about 4% higher than that of a phosphor produced with the conventional method.

One reason that the luminous efficacy of the phosphor produced according to the present invention is better than that of the phosphor produced according to the conventional method, may be because the crystallinity of the phosphor host is improved by firing the host compound of the phosphor two times.

Figure 11:
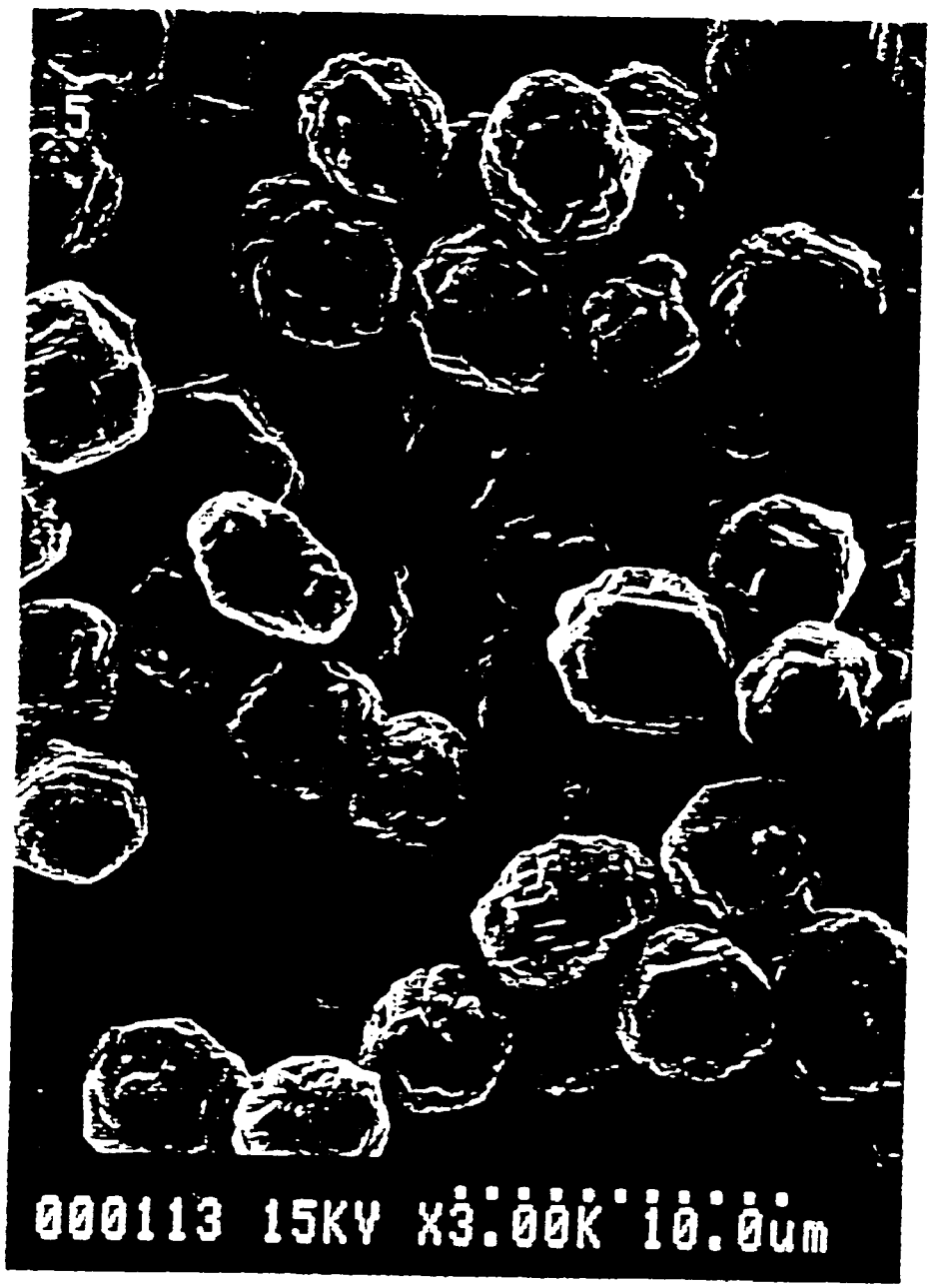
FIG. 11 is a micrograph of the phosphor obtained by Example 2 of the present invention, taken with a scanning electron microscope.

FIG. 11 shows a micrograph of a divalent europium-activated aluminate blue phosphor as expressed by $Ba_{0.9}Eu_{0.1}MgAl_{10}O_{17}$ produced with the above production method, taken with a scanning electron microscope.

From observation with a scanning electron microscope as shown in FIG. 11, it could be established, that the phosphor satisfies $(0.5 \leq y/x \leq 1.0)$, with regard to its particle shape, as explained above. Moreover, it could be established that the phosphor has a particle size concentration, as explained above, of about 80%.

Moreover, a comparison of FIG. 11 with FIG. 8 reveals that the particle shape of the phosphor is substantially the same as the particle shape of the aluminum oxide used for the raw material for the phosphor.

Moreover, when in the production method of the present invention, the raw material for the phosphor was selected so that it does not contain any halogen compounds, but does contain aluminum oxide, a divalent europium-activated phosphor is produced whose particle shape and particle size are substantially the same as that of aluminum oxide. As has been mentioned above, for a phosphor with such a particle shape and higher particle size concentration, deterioration of the phosphor due to ion bombardment when used, for example, in a fluorescent lamp can be suppressed, because the relative surface area of such phosphor particles is relatively small.

The production method of the present invention, that is, the production method of this example is especially useful for the production of divalent europium-activated aluminate phosphors, with substantially spherical particles and high particle size concentration, whose deterioration can be suppressed effectively.

The following reports the results of investigations why variations in the luminescent color of the phosphor produced with the production method according to the present invention could be considerably decreased.

Figure 12:
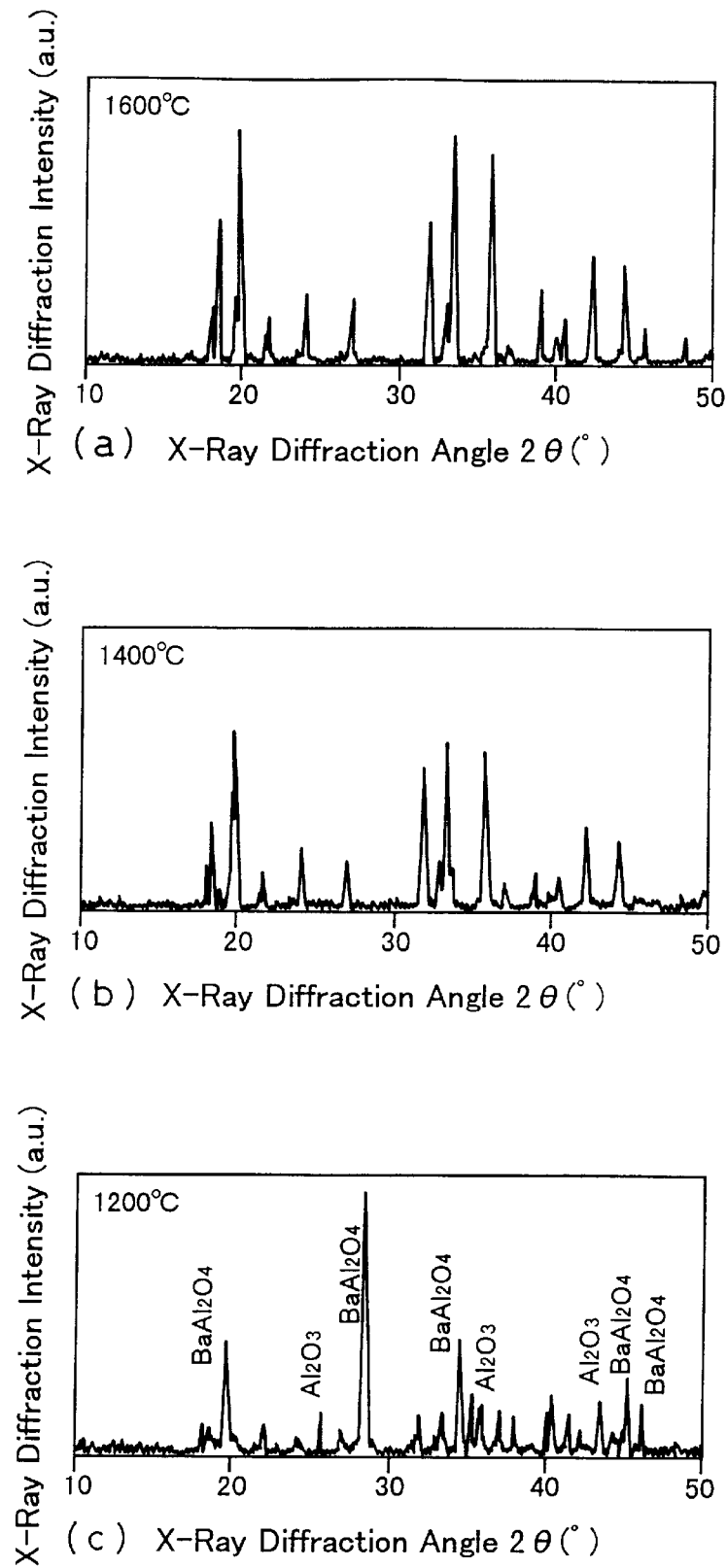
FIGS. 12(a), 12(b) and 12(c) shows X-ray diffraction patterns of the phosphor produced by the conventional production method.

FIGS. 12(a) 12(b) and 12(c) shows the diffraction pattern obtained by X-ray diffraction of the divalent europium-activated aluminate phosphor as expressed by $Ba_{0.9}Eu_{0.1}MgAl_{10}O_{17}$ produced under different firing temperatures with the conventional production method. From the X-ray diffraction pattern in FIG. 12, it can be seen that the fired product contains a lot of $Al_2O_3$, which was used as a raw material, and $BaAl_2O_4$, which is an intermediate reaction product.

On the other hand, when the firing temperature is 1600° C., the two compounds disappear almost completely, and a $Ba_{0.9}Eu_{0.1}MgAl_{10}O_{17}$ phosphor is generated.

The $Eu^{2+}$ ion is a divalent ion with an ion radius of 1.09 Å, and all ions besides $Ba^{2+}$ (1.43 Å ion radius, divalent), that is the ions including $Mg^{2+}$ (0.78 Å ion radius, divalent), and $Al^{3+}$ (0.57 Å ion radius, trivalent), have a different valence or an ion radius that is too small. Consequently, the $Eu^{2+}$ ion replaces the $Ba^{2+}$ ion (1.43 Å ion radius, divalent).

Therefore, when the firing temperature is less than 1400° C., large amounts of $Al_2O_3$ and $Ba_{0.9}Eu_{0.1}Al_2O_4$ are intermingled in the fired product.

$Ba_{0.9}Eu_{0.1}Al_2O_4$ is a divalent europium-containing phosphor luminescent in green with high luminous efficacy, which emits brightly when excited at an excitation wavelength of 254 nm.

Figure 13:
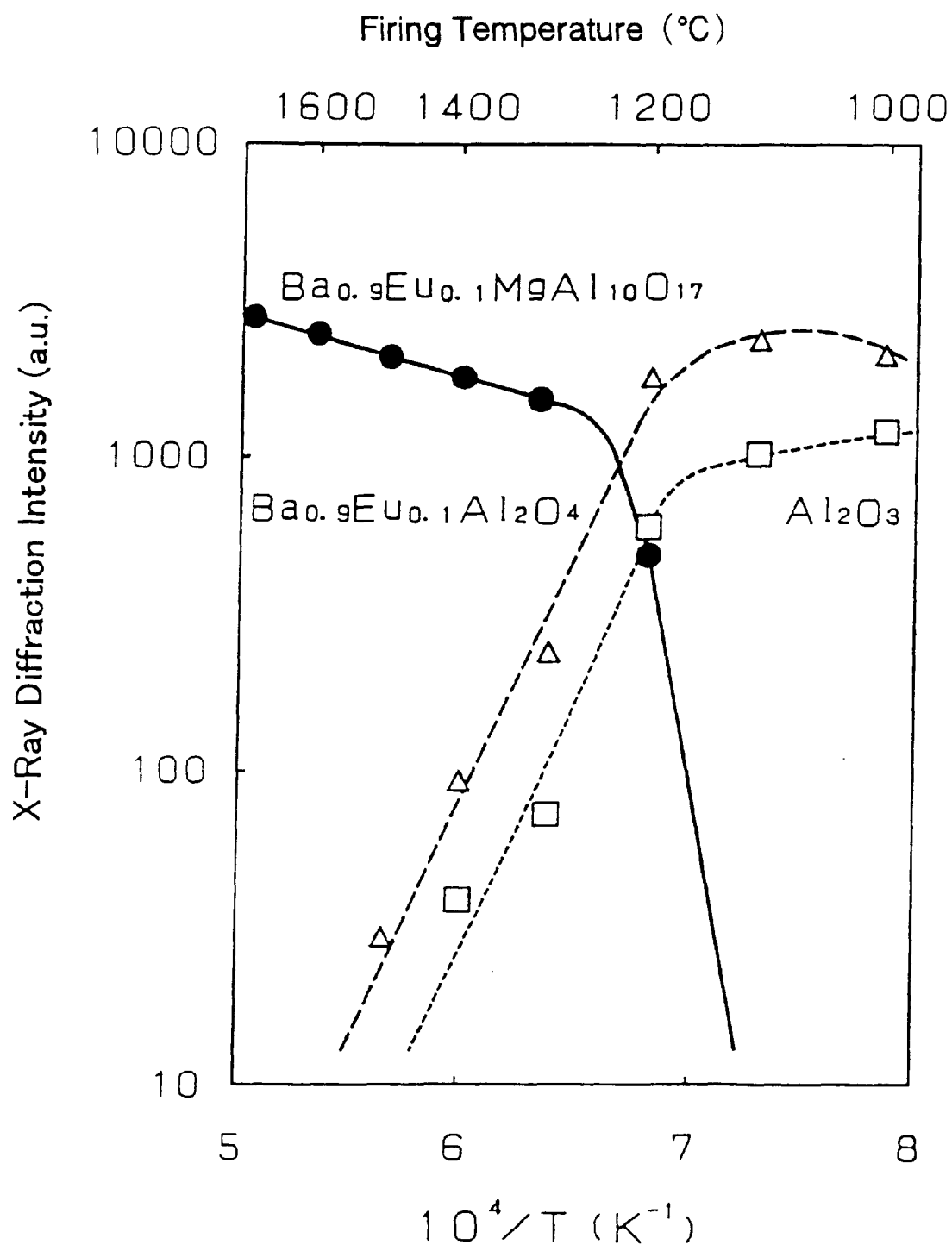
FIG. 13 illustrates how the intensity of the X-ray diffraction of the divalent europium-activated phosphor depends from the firing temperature in the conventional phosphor production method.

FIG. 13 illustrates how the intensity of the X-ray diffraction of the compound depends upon the firing temperature in the conventional phosphor production method.

It can be seen from FIG. 13 that in the conventional production method, a divalent europium-containing intermediate phosphor ($Ba_{0.9}Eu_{0.1}Al_2O_4$) is generated during the firing, then the divalent europium-containing intermediate phosphor reacts with $Al_2O_3$, and the desired divalent europium-activated phosphor ($Ba_{0.9}Eu_{0.1}MgAl_{10}O_{17}$) is generated.

Consequently, in the conventional production method, this divalent europium-containing intermediate phosphor is often intermingled. Especially when the firing temperature is low, a large amount of the divalent europium-containing intermediate phosphor is intermingled.

It could not be completely clarified in what form the Mg undergoes the above process.

Figure 14:
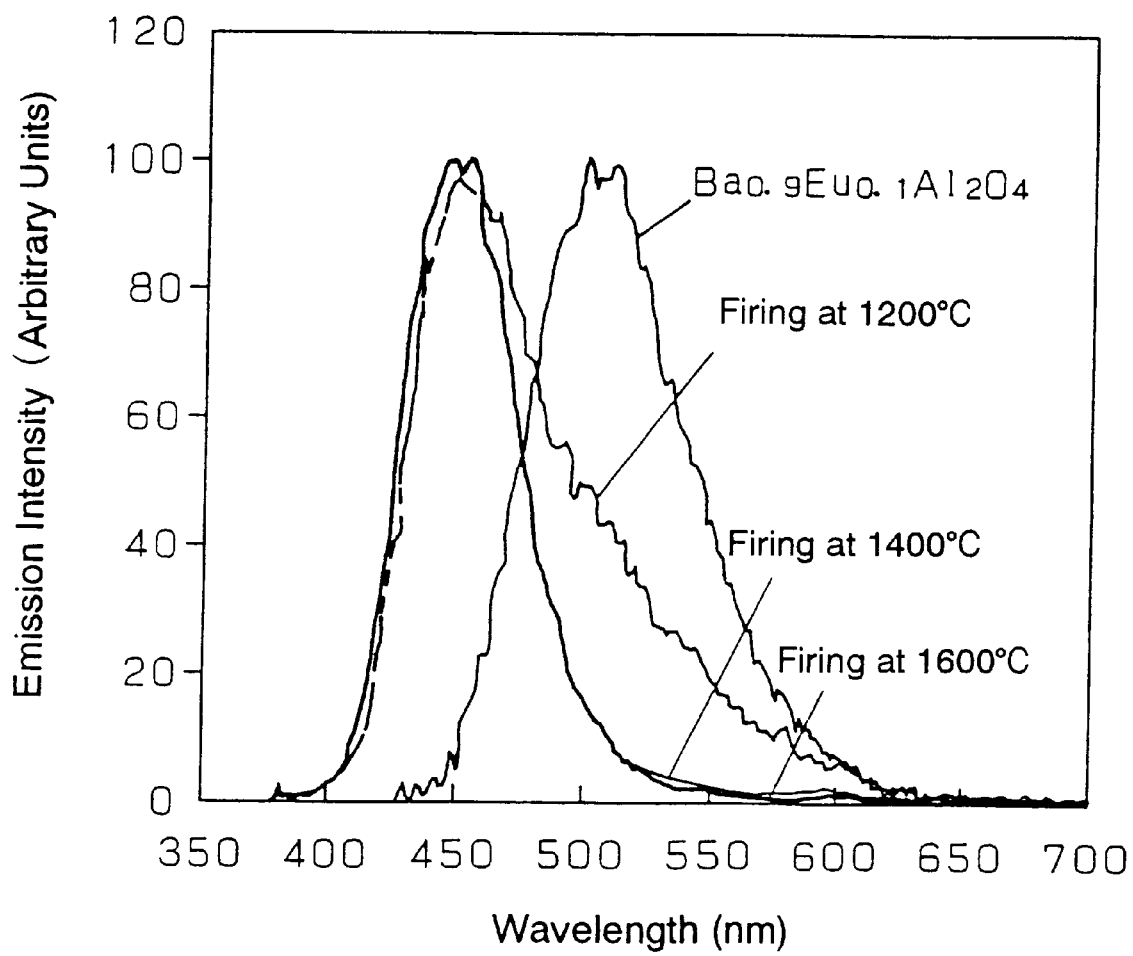
FIG. 14 illustrates the emission spectrum of the divalent europium-activated phosphor produced by the conventional phosphor production method.

FIG. 14 shows the emission spectrum of phosphors that are excited with ultra-violet rays of 254 nm wavelength. The phosphors in FIG. 14 were produced under different firing temperatures with the phosphor production step of the conventional production method. For comparison, the emission spectrum of the divalent europium-containing intermediate phosphor ($Ba_{0.9}Eu_{0.1}Al_2O_4$) is also indicated. As can be seen in FIG. 14, $Ba_{0.9}Eu_{0.1}Al_2O_4$ is a green phosphor that has an emission peak at 500 nm.

If the phosphor is fired at a low temperature of 1200° C., it is intermingled with the divalent europium-containing intermediate phosphor. Consequently, as is shown in FIG. 14, the luminescent color becomes a greenish blue with the green emission of $Ba_{0.9}Eu_{0.1}Al_2O_4$ (peak wavelength=500 nm) mixed with the blue emission of $Ba_{0.9}Eu_{0.1}MgAl_{10}O_{17}$ (peak wavelength=450 nm).

With the conventional production method, it is difficult to completely avoid the intermingling of the divalent europium-containing intermediate phosphor, even for firing temperatures of, for example, more than 1700° C. Consequently, the color purity of the blue emitted by $Ba_{0.9}Eu_{0.1}MgAl_{10}O_{17}$ decreases, and variations in the luminescent color occur.

However, the production method of the present invention offers a counter-strategy based on the scientific foundation explained above.

That is, the production method explained in Example 1 separately produces the host compound ($BaMgAl_{10}O_{17}$) and the trivalent europium compound ($EuMgAl_{11}O_{19}$; not luminescent). Consequently, the generation of divalent europium-containing intermediate phosphor ($Ba_{0.9}Eu_{0.1}Al_2O_4$) through the chemical reaction of $BaCO_3$, $Al_2O_3$, and $Eu_2O_3$ can be avoided. Thus, it is possible to generate only the desired divalent europium-activated phosphor $Ba_{0.9}Eu_{0.1}MgAl_{10}O_{17}$ with the production method of Example 1.

As has been explained with FIGS. 6(a) and 6(b), the phosphor produced with the method of Example 1 has a smaller y-value, because the intermingling of divalent europium-containing intermediate phosphor could be avoided.

Moreover, as has been explained with FIGS. 9(a) (b) and (c), a mixture of a host compound ($BaMgAl_{10}O_{17}$) and a trivalent europium compound ($AlEuO_3$, not luminescent) can be produced with the production method of Example 2. Consequently, the generation of divalent europium-containing intermediate phosphor ($Ba_{0.9}Eu_{0.1}Al_2O_4$) by the chemical reaction of $BaCO_3$ with $Al_2O_3$ and $Eu_2O_3$ can be avoided. Thus, it is possible to generate only the desired divalent europium-activated phosphor ($Ba_{0.9}Eu_{0.1}MgAl_{10}O_{17}$) with the production method of Example 2.

Figure 15:
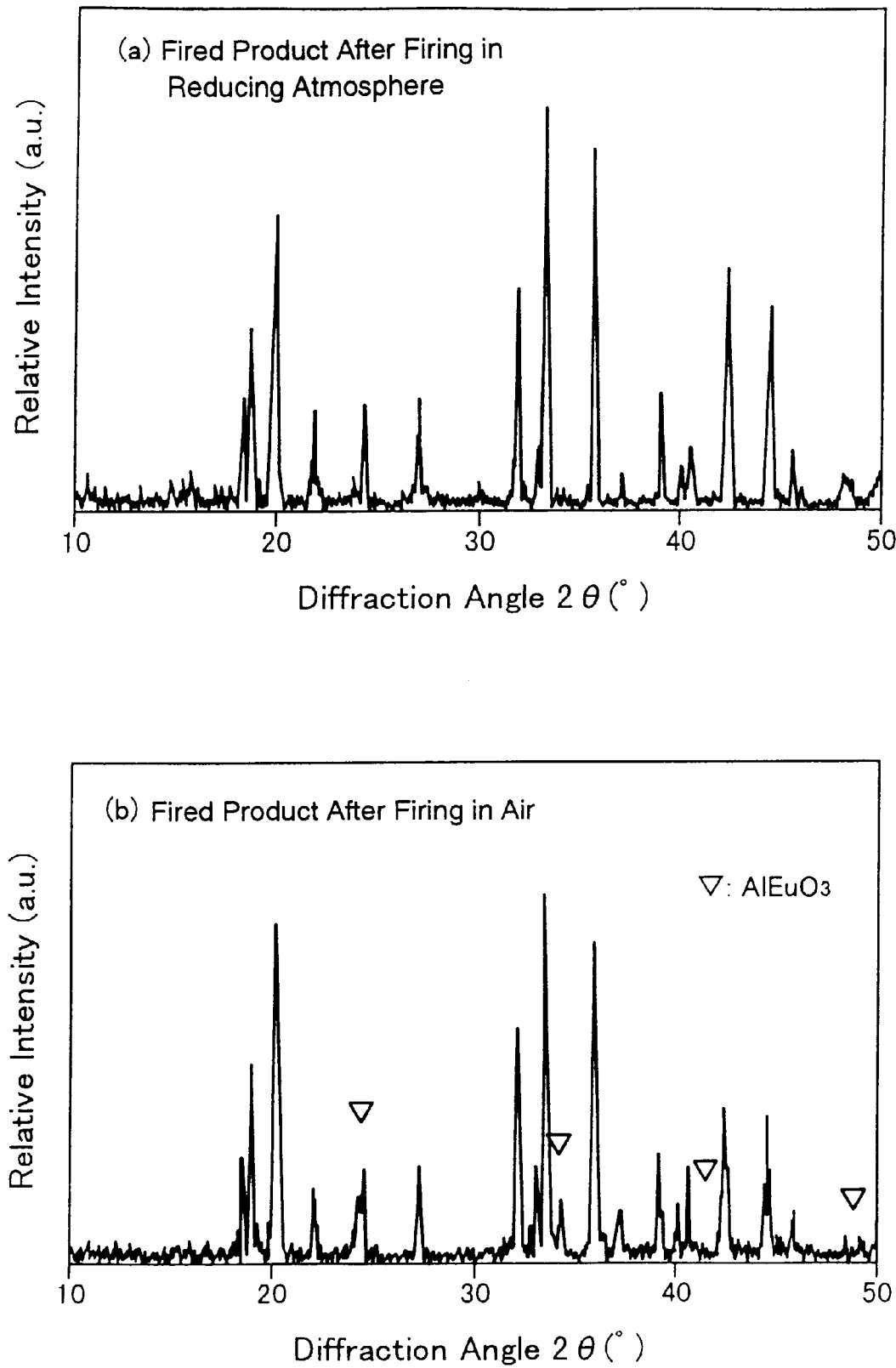
FIGS. 15(a), and 15(b) is an X-ray diffraction pattern of the fired product of Example 2 of the present invention after firing in air and after firing in a reducing atmosphere.
Figure 16:
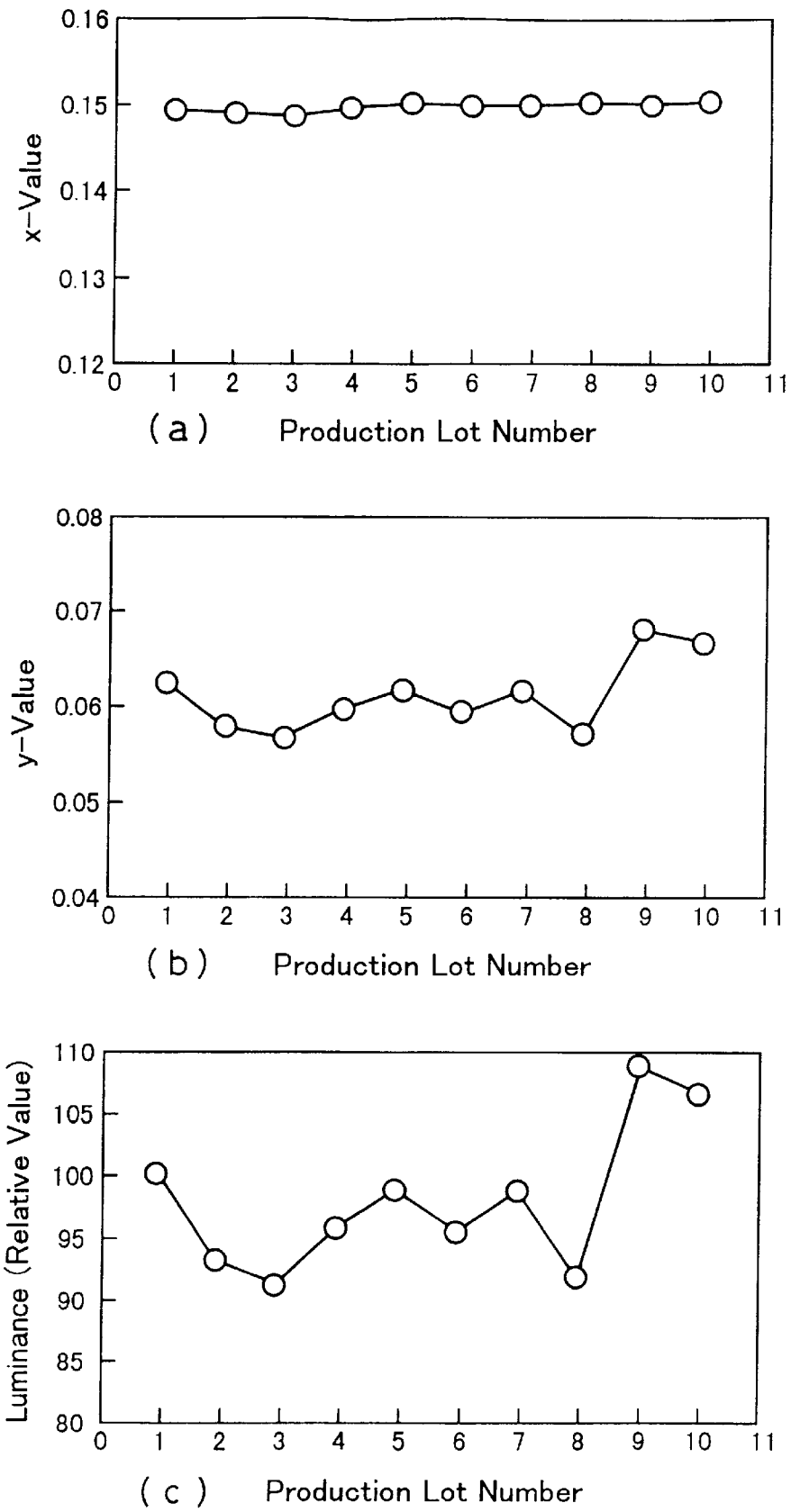
FIGS. 16(a) 16(b) and 16(c) shows the variation among different production lots of the x-value and the y-value of phosphors produced with the conventional production method.

For comparison, FIG. 15(b) shows the X-ray diffraction pattern of the fired product (intermediate product) after the intermediate production step (firing in air), and FIG. 15(a) shows the X-ray diffraction pattern of the fired product (divalent europium-activated phosphor) after the firing in a reducing atmosphere.

Figure 9:
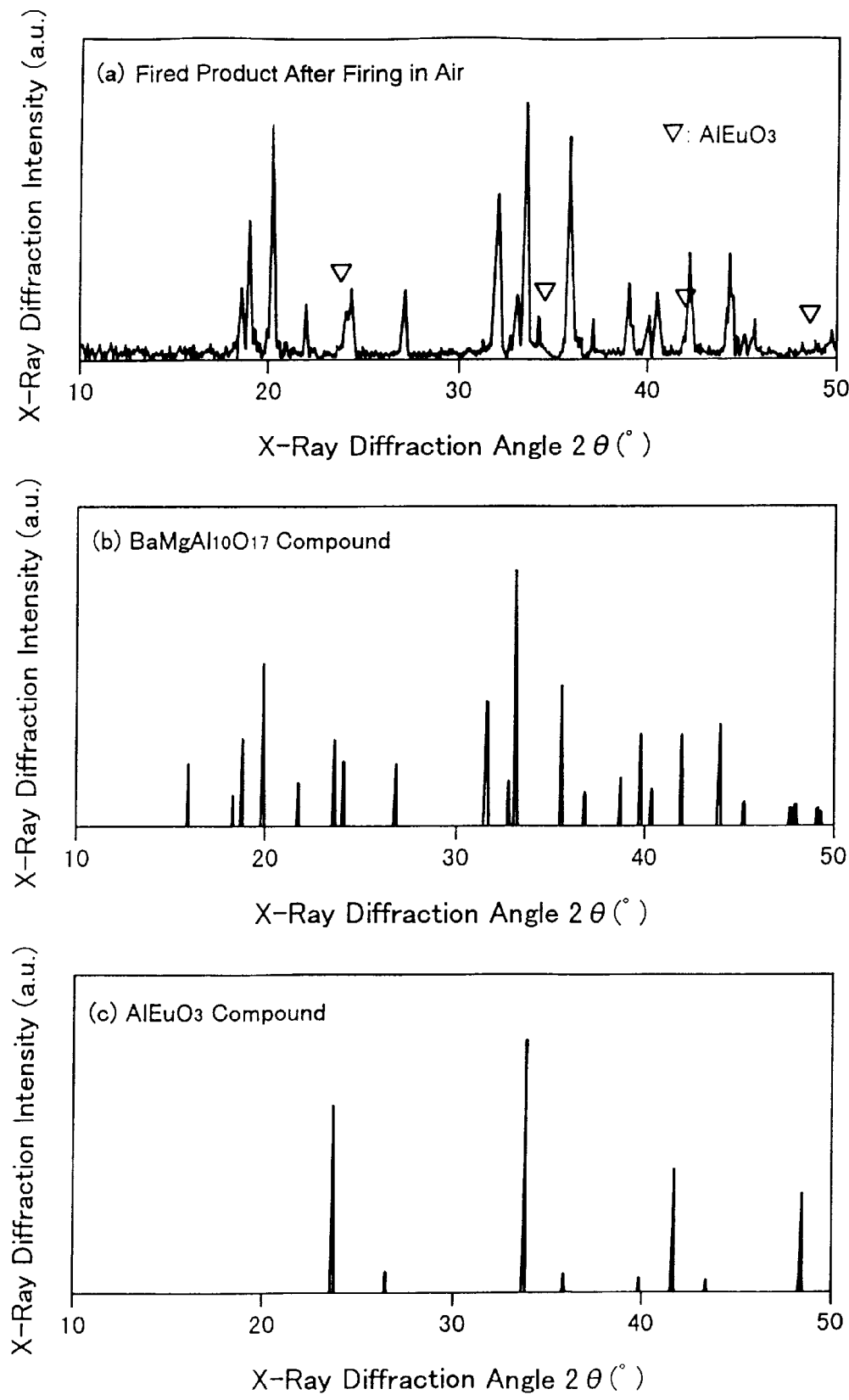
FIGS. 9(a) and 9(b) is an X-ray diffraction pattern of the fired product obtained by Example 2 of the present invention after the firing step in air.

According to FIG. 15(b), after the firing in air, the fired product is a mixture of $BaMgAl_{10}O_{17}$ and $AlEuO_3$ as shown in FIG. 9. On the other hand, FIG. 15(a) shows that when the fired product is fired in a reducing atmosphere, $Ba_{0.9}Eu_{0.1}MgAl_{10}O_{17}$ is generated.

It was confirmed that, other than $Ba_{0.9}Eu_{0.1}MgAl_{10}O_{17}$, after firing in air, the fired product does not luminesce when irradiated with ultra-violet light of 254 wavelength.

As is shown in FIG. 10, the phosphor produced with the method explained in Example 2 has smaller y-values, because the intermingling of divalent europium-containing intermediate phosphor could be prevented.

The above examples have been explained for phosphors of the chemical formula $Ba_{0.9}Eu_{0.1}MgAl_{10}O_{17}$. However, as becomes clear when considering their scientific foundation, the present invention can be equally applied to other divalent europium-activated aluminate phosphors (for example (Ba, Sr)$MgAl_{10}O_{17}$:$Eu^{2+}$, (Ba, Sr)$MgAl_{10}O_{17}$:$Eu^{2+}$, $Mn^{2+}$, or $Sr_4Al_{14}O_{25}$:$Eu^{2+}$ phosphors), or divalent europium-activated phosphor other than aluminate phosphors (for example halophosphate phosphors such as $Sr_{10}(PO_4)_6Cl_2$:$Eu^{2+}$, phosphate phosphors such as $SrMgP_2O_7$:$Eu^{2+}$, silicate phosphors such as $Ba_3MgSi_2O_8$:$Eu^{2+}$ or acid fluoride phosphors such as $SrB_4O_7$:$Eu^{2+}$).

Moreover, the raw materials used for the phosphor are not limited to the raw materials used for the above examples. It is also possible to use halogenides, such as aluminum fluoride, magnesium fluoride and europium fluoride.

Of course, when halogenides are used for the raw material for the phosphor, the particles of the produced aluminate phosphor become hexagonal plates, and the particle size concentration decreases.

Consequently, it is preferable that all raw materials for the phosphor are selected from compounds that are not halogenides.

When the $Ba_{0.9}Eu_{0.1}MgAl_{10}O_{17}$ phosphor is produced with the conventional production method using a halogenide for one of the raw materials, it is found that as the divalent europium-containing intermediate phosphor, not only $Ba_{0.9}Eu_{0.1}MgAl_2O_4$ but also $Ba_{1-x}Eu_xMgF_4$ (purple phosphor with an emission peak at 420 nm; 0<x<1) is generated.

Moreover, as becomes clear from the scientific foundation, the host compound in the above examples is not limited to $BaMgAl_{10}O_{17}$, and the trivalent europium compound is not limited to $EuMgAl_{11}O_{19}$. For example, $AlEuO_3$ can be used directly for the trivalent europium compound.

Moreover, the same effect could be attained when $Ba_{0.9}Eu_{0.1}MgAl_{10}O_{17}$ was produced by chemically reacting a mixture with $BaMgAl_{10}O_{17}$ and $AlEuO_3$ as the main components in a similar manner as described above.

Furthermore, as long as the purpose of the present invention is attained, the intermediate production step of Example 2 also can be another step than heat-processing in air.

Moreover, the firing temperature for the intermediate production step was 1650° C., but the same effects can be attained with firing temperatures in the range of 1500° C. to 1900° C.

When the firing temperature is less than 1500° C., a small amount of $Ba_{0.9}Eu_{0.1}MgAl_2O_4$ is intermingled with the $Ba_{0.9}Eu_{0.1}MgAl_{10}O_{17}$. If on the other hand, the firing temperature is higher than 1900° C., the product of the intermediate production step melts, and cannot be maintained as a powder. Consequently, a firing temperature of 1500° C. to 1900° C. is preferable.

Moreover, in the above examples, the temperature for firing in the reducing atmosphere was 1600° C., but the same effects can be attained with a firing step in a reducing atmosphere in a temperature range of 1400° C. to 1900° C.

If the firing temperature in the reducing atmosphere is less than 1400° C., then the progress of the chemical reaction is slow, and the desired phosphor cannot be sufficiently generated. On the other hand, if the firing temperature in the reducing atmosphere is more than 1900° C., then, as described above, the product melts and cannot be maintained as a powder. Consequently, a firing temperature of 1400° C. to 1900° C. is preferable.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. A method for producing a divalent europium-activated phosphor, wherein a host compound serving as a phosphor host is activated with divalent europium, comprising the steps of:

producing a host compound comprising an aluminate, wherein a raw material for the host compound is reacted; and generating a divalent europium-activated phosphor comprising a divalent europium-activated aluminate phosphor, wherein the host compound and a trivalent europium compound are reacted in a reducing atmosphere; and the divalent europium-activated aluminate phosphor has an average particle size of 0.4 $\mu$m to 20 $\mu$m.

2. The method for producing a divalent europium-activated phosphor according to claim 1, wherein a trivalent europium compound is added to the raw material for the host compound before the host compound production step.

3. The method for producing a divalent europium-activated phosphor according to claim 2, wherein an intermediate product, comprising the host compound and the trivalent europium compound as main components, is attained by adding a trivalent europium compound to the raw material for the host compound before the host compound production step.

4. The method for producing a divalent europium-activated phosphor according to claim 1, wherein the divalent europium-activated phosphor is blue luminescent.

5. The method for producing a divalent europium-activated phosphor according to claim 1, wherein the raw material for the host compound comprises an oxygenated compound.

6. The method for producing a divalent europium-activated phosphor according to claim 1, wherein the raw material for the host compound is reacted in an oxidizing atmosphere.

7. The method for producing a divalent europium-activated phosphor according to claim 6, wherein the raw material for the host compound is reacted in an oxidizing atmosphere of at least 1500° C.

8. The method for producing a divalent europium-activated phosphor according to claim 7, wherein the raw material for the host compound is reacted in an oxidizing atmosphere of not more than 1900° C.

9. The method for producing a divalent europium-activated phosphor according to claim 1, wherein the host compound and the trivalent europium compound are reacted in a reducing atmosphere of 1400° C. to 1900° C.

10. A method for producing a divalent europium-activated phosphor, wherein a host compound serving as a phosphor host is activated with divalent europium, comprising the steps of:

producing a host compound comprising an aluminate, wherein a raw material for the host compound is reacted; and generating a divalent europium-activated phosphor comprising a divalent europium-activated aluminate phosphor, wherein the host compound and a trivalent europium compound are reacted in a reducing atmosphere; and the divalent europium-activated aluminate phosphor has a particle shape that satisfies $$0.5 \leq y/x \leq 1.0,$$

wherein x is the maximum distance between two points A and B on the surface of a phosphor particle, and y is the minimum distance between two points C and D that are located on intersections of a perpendicular bisector bisecting a line segment connecting A and B with the surface of the phosphor particle.

11. The method for producing a divalent europium-activated phosphor according to claim 10, wherein a trivalent europium compound is added to the raw material for the host compound before the host compound production step.

12. The method for producing a divalent europium-activated phosphor according to claim 11, wherein an intermediate product, comprising the host compound and the trivalent europium compound as main components, is attained by adding a trivalent europium compound to the raw material for the host compound before the host compound production step.

13. The method for producing a divalent europium-activated phosphor according to claim 10, wherein the divalent europium-activated phosphor is blue luminescent.

14. The method for producing a divalent europium-activated phosphor according to claim 10, wherein the raw material for the host compound comprises an oxygenated compound.

15. The method for producing a divalent europium-activated phosphor according to claim 10, wherein the raw material for the host compound is reacted in an oxidizing atmosphere.

16. The method for producing a divalent europium-activated phosphor according to claim 15, wherein the raw material for the host compound is reacted in an oxidizing atmosphere of at least 1500° C.

17. The method for producing a divalent europium-activated phosphor according to claim 12, wherein the raw material for the host compound is reacted in an oxidizing atmosphere of not more than 1900° C.

18. The method for producing a divalent europium-activated phosphor according to claim 10, wherein the host compound and the trivalent europium compound are reacted in a reducing atmosphere of 1400° C. to 1900° C.

19. A method for producing a divalent europium-activated phosphor, wherein a host compound serving as a phosphor host is activated with divalent europium, comprising the steps of:
   producing a host compound comprising an aluminate, wherein a raw material for the host compound is reacted; and
   generating a divalent europium-activated phosphor comprising a divalent europium-activated aluminate phosphor,
   wherein the host compound and a trivalent europium compound are reacted in a reducing atmosphere; and a particle size concentration of the divalent europium-activated aluminate phosphor, which is defined as the largest value x that satisfies the equation $xA \leq d(n) \leq A/x$, wherein $d(n)$ is the particle size of an n-th phosphor particle and A is the average particle size of the phosphor, is 50% to 100%.

20. The method for producing a divalent europium-activated phosphor according to claim 19, wherein a trivalent europium compound is added to the raw material for the host compound before the host compound production step.

21. The method for producing a divalent europium-activated phosphor according to claim 20, wherein an intermediate product, comprising the host compound and the trivalent europium compound as main components, is attained by adding a trivalent europium compound to the raw material for the host compound before the host compound production step.

22. The method for producing a divalent europium-activated phosphor according to claim 19, wherein the divalent europium-activated phosphor is blue luminescent.

23. The method for producing a divalent europium-activated phosphor according to claim 19, wherein the raw material for the host compound comprises an oxygenated compound.

24. The method for producing a divalent europium-activated phosphor according to claim 19, wherein the raw material for the host compound is reacted in an oxidizing atmosphere.

25. The method for producing a divalent europium-activated phosphor according to claim 24, wherein the raw material for the host compound is reacted in an oxidizing atmosphere of at least 1500° C.

26. The method for producing a divalent europium-activated phosphor according to claim 25, wherein the raw material for the host compound is reacted in an oxidizing atmosphere of not more than 1900° C.

27. The method for producing a divalent europium-activated phosphor according to claim 19, wherein the host compound and the trivalent europium compound are reacted in a reducing atmosphere of 1400° C. to 1900° C.

28. A method for producing a divalent europium-activated phosphor, wherein a host compound serving as a phosphor host is activated with divalent europium, comprising the steps of:
   producing a host compound, wherein a raw material for the host compound is reacted; and
   generating a divalent europium-activated phosphor, wherein the host compound and a trivalent europium compound are reacted in a reducing atmosphere; wherein the host compound is an aluminate, and the divalent europium-activated phosphor is a divalent europium-activated aluminate phosphor;
   wherein the raw material for the host compound comprises aluminum oxide that has substantially the same particle shape as the divalent europium-activated aluminate phosphor.

29. The method for producing a divalent europium-activated phosphor according to claim 28, wherein a trivalent europium compound is added to the raw material for the host compound before the host compound production step.

30. The method for producing a divalent europium-activated phosphor according to claim 29, wherein an intermediate product, comprising the host compound and the trivalent europium compound as main components, is attained by adding a trivalent europium compound to the raw material for the host compound before the host compound production step.

31. The method for producing a divalent europium-activated phosphor according to claim 28, wherein the divalent europium-activated phosphor is blue luminescent.

32. The method for producing a divalent europium-activated phosphor according to claim 28, wherein the raw material for the host compound comprises an oxygenated compound.

33. The method for producing a divalent europium-activated phosphor according to claim 28, wherein the raw material for the host compound is reacted in an oxidizing atmosphere.

34. The method for producing a divalent europium-activated phosphor according to claim 33, wherein the raw material for the host compound is reacted in an oxidizing atmosphere of at least 1500° C.

35. The method for producing a divalent europium-activated phosphor according to claim 34, wherein the raw material for the host compound is reacted in an oxidizing atmosphere of not more than 1900° C.

36. The method for producing a divalent europium-activated phosphor according to claim 28, wherein the host compound and the trivalent europium compound are reacted in a reducing atmosphere of 1400° C. to 1900° C.

37. A method for producing a divalent europium-activated phosphor, wherein a host compound serving as a phosphor host is activated with divalent europium, comprising the steps of:
   producing a host compound, wherein a raw material for the host compound is reacted; and
   generating a divalent europium-activated phosphor, wherein the host compound and a trivalent europium compound are reacted in a reducing atmosphere; wherein the host compound is an aluminate, and the divalent europium-activated phosphor is a divalent europium-activated aluminate phosphor;
   wherein the raw material for the host compound comprises aluminum oxide that has an average particle size of 0.4 $\mu$m to 20 $\mu$m.

38. The method for producing a divalent europium-activated phosphor according to claim 37, wherein a trivalent europium compound is added to the raw material for the host compound before the host compound production step.

39. The method for producing a divalent europium-activated phosphor according to claim 38, wherein an intermediate product, comprising the host compound and the trivalent europium compound as main components, is attained by adding a trivalent europium compound to the raw material for the host compound before the host compound production step.

40. The method for producing a divalent europium-activated phosphor according to claim 38, wherein the divalent europium-activated phosphor is blue luminescent.

41. The method for producing a divalent europium-activated phosphor according to claim 37, wherein the raw material for the host compound comprises an oxygenated compound.

42. The method for producing a divalent europium-activated phosphor according to claim 37, wherein the raw material for the host compound is reacted in an oxidizing atmosphere.

43. The method for producing a divalent europium-activated phosphor according to claim 42, wherein the raw material for the host compound is reacted in an oxidizing atmosphere of at least 1500° C.

44. The method for producing a divalent europium-activated phosphor according to claim 43, wherein the raw material for the host compound is reacted in an oxidizing atmosphere of not more than 1900° C.

45. The method for producing a divalent europium-activated phosphor according to claim 37, wherein the host compound and the trivalent europium compound are reacted in a reducing atmosphere of 1400° C. to 1900° C.

46. A method for producing a divalent europium-activated phosphor, wherein a host compound serving as a phosphor host is activated with divalent europium, comprising the steps of:
producing a host compound, wherein a raw material for the host compound is reacted; and
generating a divalent europium-activated phosphor, wherein the host compound and a trivalent europium compound are reacted in a reducing atmosphere; wherein the host compound is an aluminate, and the divalent europium-activated phosphor is a divalent europium-activated aluminate phosphor;
wherein the raw material for the host compound comprises aluminum oxide that has a particle shape that satisfies $$0.5 \leq y/x \leq 1.0,$$

wherein x is the maximum distance between two points A and B on the surface of an aluminum oxide particle, and
y is the minimum distance between two points C and D that are located on intersections of a perpendicular bisector bisecting a line segment connecting A and B with the surface of the aluminum oxide particle.

47. The method for producing a divalent europium-activated phosphor according to claim 46, wherein a trivalent europium compound is added to the raw material for the host compound before the host compound production step.

48. The method for producing a divalent europium-activated phosphor according to claim 47, wherein an intermediate product, comprising the host compound and the trivalent europium compound as main components, is attained by adding a trivalent europium compound to the raw material for the host compound before the host compound production step.

49. The method for producing a divalent europium-activated phosphor according to claim 46, wherein the divalent europium-activated phosphor is blue luminescent.

50. The method for producing a divalent europium-activated phosphor according to claim 46, wherein the raw material for the host compound comprises an oxygenated compound.

51. The method for producing a divalent europium-activated phosphor according to claim 46, wherein the raw material for the host compound is reacted in an oxidizing atmosphere.

52. The method for producing a divalent europium-activated phosphor according to claim 51, wherein the raw material for the host compound is reacted in an oxidizing atmosphere of at least 1500° C.

53. The method for producing a divalent europium-activated phosphor according to claim 52, wherein the raw material for the host compound is reacted in an oxidizing atmosphere of not more than 1900° C.

54. The method for producing a divalent europium-activated phosphor according to claim 46, wherein the host compound and the trivalent europium compound are reacted in a reducing atmosphere of 1400° C. to 1900° C.

55. A method for producing a divalent europium-activated phosphor, wherein a host compound serving as a phosphor host is activated with divalent europium, comprising the steps of:
producing a host compound, wherein a raw material for the host compound is reacted; and
generating a divalent europium-activated phosphor, wherein the host compound and a trivalent europium compound are reacted in a reducing atmosphere; wherein the host compound is an aluminate, and the divalent europium-activated phosphor is a divalent europium-activated aluminate phosphor;
wherein the raw material for the host compound comprises aluminum oxide that has a particle size concentration, which is defined as the largest value x that satisfies the equation $xA \leq d(n) \leq A/x$, wherein $d(n)$ is the particle size of an n-th aluminum oxide particle and A is the average particle size of the aluminum oxide, is 50% to 100%.

56. The method for producing a divalent europium-activated phosphor according to claim 55, wherein a trivalent europium compound is added to the raw material for the host compound before the host compound production step.

57. The method for producing a divalent europium-activated phosphor according to claim 56, wherein an intermediate product, comprising the host compound and the trivalent europium compound as main components, is attained by adding a trivalent europium compound to the raw material for the host compound before the host compound production step.

58. The method for producing a divalent europium-activated phosphor according to claim 55, wherein the divalent europium-activated phosphor is blue luminescent.

59. The method for producing a divalent europium-activated phosphor according to claim 55, wherein the raw material for the host compound comprises an oxygenated compound.

60. The method for producing a divalent europium-activated phosphor according to claim 55, wherein the raw material for the host compound is reacted in an oxidizing atmosphere.

61. The method for producing a divalent europium-activated phosphor according to claim 60, wherein the raw material for the host compound is reacted in an oxidizing atmosphere of at least 1500° C.

62. The method for producing a divalent europium-activated phosphor according to claim 61, wherein the raw material for the host compound is reacted in an oxidizing atmosphere of not more than 1900° C.

63. The method for producing a divalent europium-activated phosphor according to claim 55, wherein the host compound and the trivalent europium compound are reacted in a reducing atmosphere of 1400° C. to 1900° C.

64. A method for producing a divalent europium-activated phosphor, wherein a host compound serving as a phosphor host is activated with divalent europium, comprising the steps of:
producing a host compound, wherein a raw material for the host compound is reacted; and
generating a divalent europium-activated phosphor, wherein the host compound and a trivalent europium compound are reacted in a reducing atmosphere, wherein the raw material for the host compound is free from halogenide.

65. The method for producing a divalent europium-activated phosphor according to claim 64, wherein a trivalent europium compound is added to the raw material for the host compound before the host compound production step.

66. The method for producing a divalent europium-activated phosphor according to claim 65, wherein an intermediate product, comprising the host compound and the trivalent europium compound as main components, is attained by adding a trivalent europium compound to the raw material for the host compound before the host compound production step.

67. The method for producing a divalent europium-activated phosphor according to claim 64, wherein the divalent europium-activated phosphor is blue luminescent.

68. The method for producing a divalent europium-activated phosphor according to claim 64, wherein the raw material for the host compound comprises an oxygenated compound.

69. The method for producing a divalent europium-activated phosphor according to claim 64, wherein the raw material for the host compound is reacted in an oxidizing atmosphere.

70. The method for producing a divalent europium-activated phosphor according to claim 69, wherein the raw material for the host compound is reacted in an oxidizing atmosphere of at least 1500° C.

71. The method for producing a divalent europium-activated phosphor according to claim 70, wherein the raw material for the host compound is reacted in an oxidizing atmosphere of not more than 1900° C.

72. The method for producing a divalent europium-activated phosphor according to claim 64, wherein the host compound and the trivalent europium compound are reacted in a reducing atmosphere of 1400° C. to 1900° C.

73. A method for producing a divalent europium-activated phosphor, wherein a host compound serving as a phosphor host is activated with divalent europium, comprising the steps of:

producing a host compound wherein a raw material for the host compound is reacted; and generating a divalent europium-activated phosphor, wherein the host compound and a trivalent europium compound are reacted in a reducing atmosphere, wherein the divalent europium-activated phosphor comprises a compound with the formula $(Ba_aSr_bCa_cEu_d)(Mg_eZn_fMn_g)Al_{10}O_{17}$, wherein $0<a<1$; $0 \leq b \leq 1$; $c<1$; $0<d<1$; $a+b+c+d=1$; $0<e \leq 1$; $0 \leq f<1$; $0 \leq g<1$; and $e+f+g=1$.

74. The method for producing a divalent europium-activated phosphor according to claim 73, wherein a trivalent europium compound is added to the raw material for the host compound before the host compound production step.

75. The method for producing a divalent europium-activated phosphor according to claim 74, wherein an intermediate product, comprising the host compound and the trivalent europium compound as main components, is attained by adding a trivalent europium compound to the raw material for the host compound before the host compound production step.

76. The method for producing a divalent europium-activated phosphor according to claim 73, wherein the divalent europium-activated phosphor is blue luminescent.

77. The method for producing a divalent europium-activated phosphor according to claim 73, wherein the raw material for the host compound comprises an oxygenated compound.

78. The method for producing a divalent europium-activated phosphor according to claim 73, wherein the raw material for the host compound is reacted in an oxidizing atmosphere.

79. The method for producing a divalent europium-activated phosphor according to claim 78, wherein the raw material for the host compound is reacted in an oxidizing atmosphere of at least 1500° C.

80. The method for producing a divalent europium-activated phosphor according to claim 77, wherein the raw material for the host compound is reacted in an oxidizing atmosphere of not more than 1900° C.

81. The method for producing a divalent europium-activated phosphor according to claim 73, wherein the host compound and the trivalent europium compound are reacted in a reducing atmosphere of 1400° C. to 1900° C.

82. A method for producing a divalent europium-activated phosphor, wherein a host compound serving as a phosphor host is activated with divalent europium, comprising the steps of:

producing a host compound, wherein a raw material for the host compound is reacted; and generating a divalent europium-activated phosphor, wherein the host compound and a trivalent europium compound are reacted in a reducing atmosphere, wherein the host compound serving as a phosphor comprises a compound with the formula $(Ba_aSr_bCa_c)(Mg_eZn_f)Al_{10}O_{17}$, wherein $0<a<1$; $0 \leq b \leq 1$; $c<1$; $a+b+c=1$; $0<e \leq 1$; $0 \leq f<1$; and $e+f=1$.

83. The method for producing a divalent europium-activated phosphor according to claim 82, wherein a trivalent europium compound is added to the raw material for the host compound before the host compound production step.

84. The method for producing a divalent europium-activated phosphor according to claim 83, wherein an intermediate product, comprising the host compound and the trivalent europium compound as main components, is attained by adding a trivalent europium compound to the raw material for the host compound before the host compound production step.

85. The method for producing a divalent europium-activated phosphor according to claim 82, wherein the divalent europium-activated phosphor is blue luminescent.

86. The method for producing a divalent europium-activated phosphor according to claim 82, wherein the raw material for the host compound comprises an oxygenated compound.

87. The method for producing a divalent europium-activated phosphor according to claim 82, wherein the raw material for the host compound is reacted in an oxidizing atmosphere.

88. The method for producing a divalent europium-activated phosphor according to claim 87, wherein the raw material for the host compound is reacted in an oxidizing atmosphere of at least 1500° C.

89. The method for producing a divalent europium-activated phosphor according to claim 88, wherein the raw material for the host compound is reacted in an oxidizing atmosphere of not more than 1900° C.

90. The method for producing a divalent europium-activated phosphor according to claim 12, wherein the host compound and the trivalent europium compound are reacted in a reducing atmosphere of 1400° C. to 1900° C.

* * * * *

UNITED STATES PATENT AND TRADEMARK OFFICE
CERTIFICATE OF CORRECTION

PATENT NO.    : 6,096,243
DATED         : August 1, 2000
INVENTOR(S)   : Oshio et al.

It is certified that error appears in the above-identified patent and that said Letters Patent is hereby corrected as shown below:

Column 23,
Line 38, "$0 \leqq b \leqq 1;$" should read -- $0 \leqq b < 1;$ --

Column 24,
Line 24, "$0 < a < 1; 0 \leqq b \leqq 1;$" should read -- $0 < a \leqq 1; 0 \leqq b < 1;$ --

Signed and Sealed this

Tenth Day of June, 2003

JAMES E. ROGAN
*Director of the United States Patent and Trademark Office*